US012669390B2

(12) United States Patent
Ausserlechner

(10) Patent No.: US 12,669,390 B2
(45) Date of Patent: Jun. 30, 2026

(54) SEMICONDUCTOR CIRCUIT ARRANGEMENT AND METHOD FOR A SEMICONDUCTOR CIRCUIT ARRANGEMENT

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 329 days.

(21) Appl. No.: 18/473,546

(22) Filed: Sep. 25, 2023

(65) Prior Publication Data

US 2024/0110839 A1 Apr. 4, 2024

(30) Foreign Application Priority Data

Sep. 26, 2022 (DE) .......................... 102022124592.6

(51) Int. Cl.
*G01L 1/22* (2006.01)
*G01L 1/18* (2006.01)

(52) U.S. Cl.
CPC .............. *G01L 1/2281* (2013.01); *G01L 1/18* (2013.01); *G01L 1/2293* (2013.01)

(58) Field of Classification Search
None
See application file for complete search history.

(56) References Cited

U.S. PATENT DOCUMENTS

2022/0020915 A1* 1/2022 Nurmetov ............ H10N 30/802

FOREIGN PATENT DOCUMENTS

| | | |
|---|---|---|
| DE | 102006045141 B3 | 4/2008 |
| DE | 1020006045141 * | 4/2008 |
| DE | 102008051949 A1 | 5/2009 |

OTHER PUBLICATIONS

Motz, M.; Ausserlechner, U., "Electrical compensation of mechanical stress drift in precision analog circuits," Wideband Continous-time ΣΔ ADCs, Automotive Electronics, and Power Management, Springer International Publishing Switzerland, 2017, pp. 297-326.

* cited by examiner

*Primary Examiner* — Eric S. McCall
*Assistant Examiner* — Nigel H Plumb
(74) *Attorney, Agent, or Firm* — Harrity & Harrity, LLP

(57) ABSTRACT

A semiconductor circuit arrangement includes a substrate, at least two first stress-sensitive elements in a first region of the substrate and at least two second stress-sensitive elements in a second region of the substrate. The first stress-sensitive elements each have an electrical characteristic which is dependent on a first component and a second component of a mechanical stress tensor in the first region. The second stress-sensitive elements each have an electrical characteristic which is dependent on a first component and a second component of a mechanical stress tensor in the second region. The semiconductor circuit arrangement includes a measuring circuit configured, based on the respective electrical characteristics of the first stress-sensitive elements and of the second stress-sensitive elements, to determine a stress difference between the first components in the first and second regions and a stress difference between the second components in the first and second regions.

20 Claims, 11 Drawing Sheets

100

Figure 7:
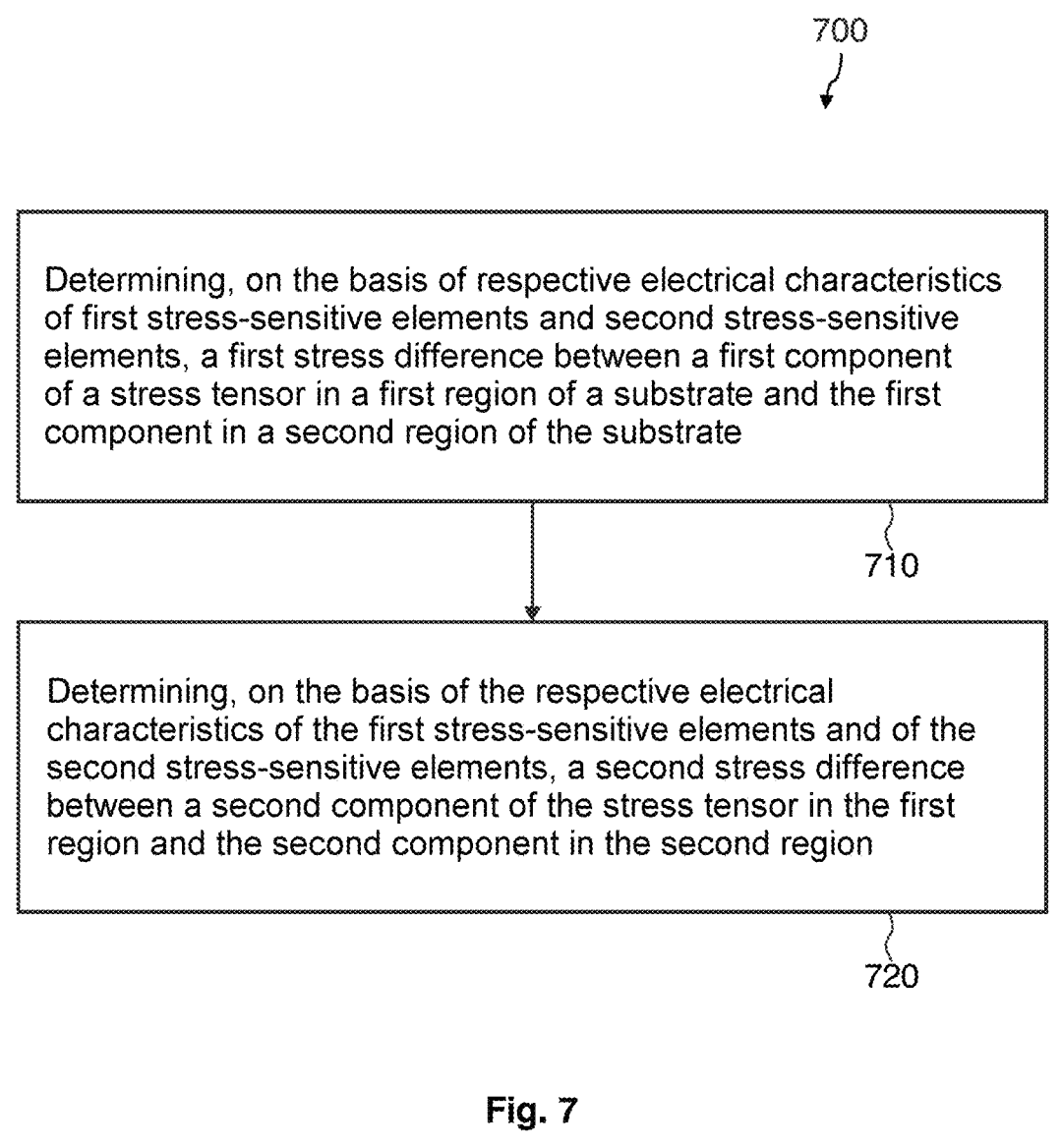

700

Determining, on the basis of respective electrical characteristics of first stress-sensitive elements and second stress-sensitive elements, a first stress difference between a first component of a stress tensor in a first region of a substrate and the first component in a second region of the substrate

710

Determining, on the basis of the respective electrical characteristics of the first stress-sensitive elements and of the second stress-sensitive elements, a second stress difference between a second component of the stress tensor in the first region and the second component in the second region

SEMICONDUCTOR CIRCUIT ARRANGEMENT AND METHOD FOR A SEMICONDUCTOR CIRCUIT ARRANGEMENT

CROSS-REFERENCE TO RELATED APPLICATION

This application claims priority to German Patent Application No. 102022124592.6 filed on Sep. 26, 2022, the content of which is incorporated by reference herein in its entirety.

TECHNICAL FIELD

The present disclosure relates to the determination of mechanical stress in a semiconductor substrate. Example implementations relate to a semiconductor circuit arrangement and to a method for a semiconductor circuit arrangement.

BACKGROUND

Mechanical stress in a semiconductor circuit may lead to a change in sensitivity of a sensor element. However, conventional methods for measuring the mechanical stress may require a complex circuit design or may be inaccurate.

SUMMARY

A first aspect of the present disclosure relates to a semiconductor circuit arrangement. The semiconductor circuit arrangement includes a substrate, at least two first stress-sensitive elements in a first region of the substrate and at least two second stress-sensitive elements in a second region of the substrate. The first stress-sensitive elements each have an electrical characteristic which is dependent on a first component and a second component of a mechanical stress tensor in the first region. The second stress-sensitive elements each have an electrical characteristic which is dependent on a first component and a second component of a mechanical stress tensor in the second region. The semiconductor circuit arrangement furthermore includes a measuring circuit configured, based on the respective electrical characteristics of the first stress-sensitive elements and of the second stress-sensitive elements, to determine a first stress difference between the first component in the first region and the first component in the second region and to determine a second stress difference between the second component in the first region and the second component in the second region.

A second aspect of the present disclosure relates to a semiconductor circuit arrangement. The semiconductor circuit arrangement includes a substrate, a first stress-sensitive element and a second stress-sensitive element in a first region of the substrate, a third stress-sensitive element and a fourth stress-sensitive element in a second region of the substrate. The first stress-sensitive element and the third stress-sensitive element each have an electrical characteristic which is dependent at least on a first component of a mechanical stress tensor in the first region and in the second region, respectively. The second stress-sensitive element and the fourth stress-sensitive element each have an electrical characteristic which is dependent at least on a second component of the mechanical stress tensor in the first region and in the second region, respectively. The semiconductor circuit arrangement furthermore includes a measuring circuit configured, based on the respective electrical characteristics of the first stress-sensitive element and of the third stress-sensitive element, to determine a first stress difference between the first component in the first region and the first component in the second region and, based on the respective electrical characteristics of the second stress-sensitive element and of the fourth stress-sensitive element, to determine a second stress difference between the second component in the first region and the second component in the second region.

A third aspect of the present disclosure relates to a method for a semiconductor circuit arrangement including a substrate, at least two first stress-sensitive elements in a first region of the substrate, wherein the first stress-sensitive elements each have an electrical characteristic which is dependent on a first component and a second component of a mechanical stress tensor in the first region, and at least two second stress-sensitive elements in a second region of the substrate, wherein the second stress-sensitive elements each have an electrical characteristic which is dependent on a first component and a second component of a mechanical stress tensor in the second region. The method includes determining, based on the respective electrical characteristics of the first stress-sensitive elements and of the second stress-sensitive elements, a first stress difference between the first component in the first region and the first component in the second region, and determining, based on the respective electrical characteristics of the first stress-sensitive elements and of the second stress-sensitive elements, a second stress difference between the second component in the first region and the second component in the second region.

BRIEF DESCRIPTION OF THE DRAWINGS

Some examples of devices and/or methods will be explained in greater detail below merely by way of example with reference to the accompanying figures, in which:

FIG. 7 shows a flow diagram of one example of a method for a semiconductor circuit arrangement.

DETAILED DESCRIPTION

Some examples will now be described more thoroughly with reference to the accompanying figures. However, further possible examples are not restricted to the features of these implementations described in detail. These may have modifications of the features and counterparts and alternatives to the features. Furthermore, the terminology used herein for describing specific examples is not intended to be limiting for further possible examples.

Throughout the description of the figures, identical or similar reference signs refer to identical or similar elements or features which can be implemented in each case identically or else in modified form, while they provide the same or a similar function. In the figures, furthermore, the thicknesses of lines, layers and/or regions may be exaggerated for elucidation purposes.

If two elements A and B are combined using an "or", this should be understood such that all possible combinations are disclosed, e.g., only A, only B, and A and B, unless expressly defined otherwise in an individual case. As alternative wording for the same combinations, it is possible to use "at least one out of A and B" or "A and/or B". That applies equivalently to combinations of more than two elements.

If a singular form, e.g., "a, an" and "the", is used and the use of only a single element is defined neither explicitly nor implicitly as obligatory, further examples can also use a plurality of elements in order to implement the same function. If a function is described below as being implemented using a plurality of elements, further examples can implement the same function using a single element or a single processing entity. Furthermore, it goes without saying that the terms "comprises", "comprising", "has" and/or "having" in their usage describe the presence of the specified features, integers, steps, operations, processes, elements, components and/or a group thereof, but do not exclude the presence or the addition of one or more other features, integers, steps, operations, processes, elements, components and/or a group thereof.

Figure 1:
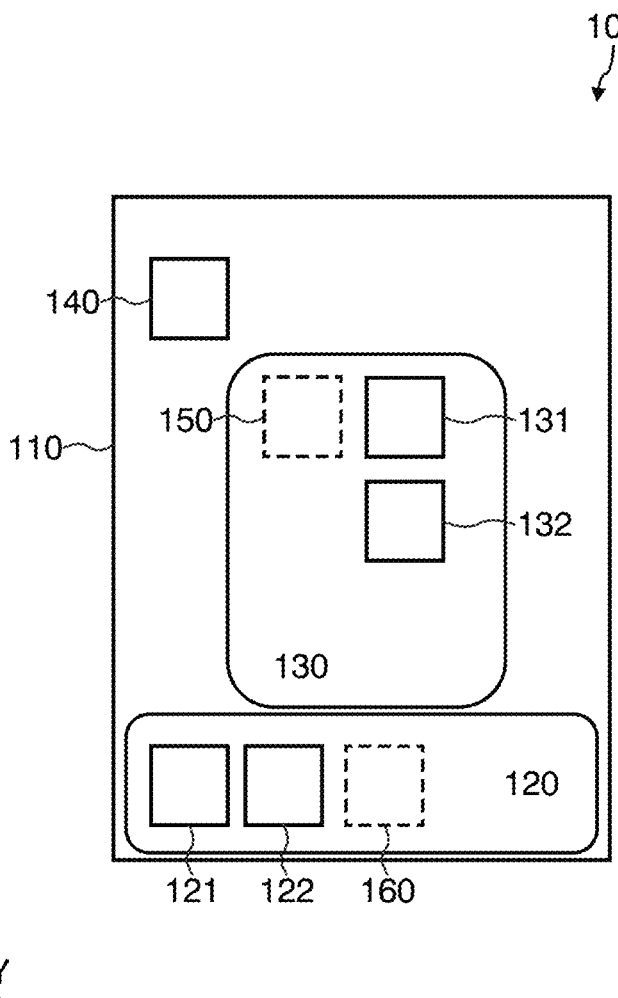
FIG. 1 shows one example of a semiconductor circuit arrangement according to the implementation.

FIG. 1 shows a schematic illustration of one example of a semiconductor circuit arrangement 100 according to the implementation. Such a semiconductor circuit arrangement 100 can be any circuit (e.g., discrete circuit) which is attached to a semiconductor or which is integrated therein. For example, the semiconductor circuit arrangement 100 can be a semiconductor die having an integrated circuit or a package having an (e.g., micro-)electronic circuit.

The semiconductor circuit arrangement 100 comprises a (semiconductor) substrate 110. The substrate 110 can have various regions which differ with regard to a mechanical stress of the substrate 110 that is to be expected in the respective region. FIG. 1 shows for instance a first region 120 near an edge of the substrate 110 and a second region 130 in a central region along the x-y-extent of the substrate 110. It should be noted that the regions 120, 130 shown in FIG. 1 are used merely for elucidation purposes. In other examples, the regions 120, 130 can be arranged differently in the substrate 110 or can have a different shape or size than the regions 120, 130 shown in FIG. 1.

The regions 120, 130 should be understood as abstract, imaginary regions of the substrate 110 which do not necessarily differ in their constitution. The regions 120, 130 should be chosen for example in terms of their arrangement, size and shape such that—depending on the target application of the semiconductor circuit arrangement 100—they make it possible to represent the different mechanical conditions in the regions 120, 130.

The first region 120 can correspond for instance to a target region, that is to say to a region of the substrate 110 in which at least one relevant component of a mechanical stress is intended to be measured in a target application. A measurement of the mechanical stress in the first region 120 can be relevant to many different applications, for instance for calibrating a sensor element in the first region 120, for determining the aging of components in the first region 120 or for detecting improper use of the semiconductor circuit arrangement 100 (e.g., undesirable manipulation, reverse engineering or incorrect use of the semiconductor circuit arrangement 100).

In some example implementations, an "inhomogeneous" mechanical stress to be expected can be assumed in the first region 120. By way of example, in a target application it can be expected that at least one relevant component of the mechanical stress tensor in the first region 120 is not (sufficiently for the target application) constant e.g., along the x-y-plane, and differs by a non-negligible value from the component of the mechanical stress tensor in the second region 130 and/or at least one component of the mechanical stress tensor is non-negligible. The first region 120 can be arranged for example near an edge of the substrate 110 (chip periphery) or in a corner of the substrate 110. Alternatively, in the case where the semiconductor circuit arrangement 100 (the chip) is adhesively bonded onto the die paddle of a leadframe, the first region 120 can be arranged around a slot, a hole or a profile (which is not flat at the adhesive bonding surface). The inhomogeneity can be higher, the thinner the substrate 110 (in the z-direction) in comparison with the x-y-extent.

The second region 130 can correspond for instance to a reference region, that is to say a region of the substrate 110 in which the component of the mechanical stress which is relevant to the target application is easy to determine, negligible or known. By way of example, a "homogeneous" mechanical stress to be expected can be assumed in the second region 130. By way of example, in a target application a component of the stress tensor in the second region 130 (for instance one or more in-plane normal stresses $\sigma_{xx}$, $\sigma_{yy}$) can be assumed approximately to be constant (for instance along the x-y-plane) and/or at least one component of the stress tensor in the reference region 130 (for instance an out-of-plane normal stress $\sigma_{zz}$ or a shear stress $\sigma_{xy}$) can be assumed to be negligible.

Such a reference region 130 can arise for instance from a structure of the substrate 110, that is to say that its extent, shape and arrangement in the substrate 110 can be dependent for example on the extent of the substrate 110 (or of a package of the semiconductor circuit arrangement 100) in the x-, y-, and z-directions or a shape of the substrate 110 (or of the package).

In some example implementations, for instance, the substrate 110 can be assumed to be a planar, plate-shaped structure having a lateral extent, that is to say an extent in the x- and y-directions, which is much larger than its vertical extent, that is to say the extent in the z-direction. By way of example, the lateral extent of the substrate 110 can be at least five times its vertical extent. For latter cases it can be assumed that mechanical properties of the substrate 110 can be approximated by the plate theory from technical mechanics. At least for a large portion of the substrate 110—for instance over an entire x-y-area of the substrate 110 (including the second region 130) with the exception of an edge region of the substrate 110 (including the first region 120)— it can therefore hold true that the out-of-plane normal stress ($\sigma_{zz}$; normal stress normal to the x-y-area) is negligible and that a mechanical stress principally in the x-y-plane acts on the substrate 110. This is elucidated in FIG. 2a to FIG. 2d, which show an example distribution of mechanical stress in an example semiconductor circuit arrangement 200.

The semiconductor circuit arrangement 200 shown in FIG. 2a to FIG. 2d comprises a package 210 (e.g., a plastic encapsulation) curved in the z-direction and a substrate 220 encapsulated in the package. The substrate 220 is attached to a (e.g., copper) leadframe 230. By way of example, a microelectronic circuit can be integrated in the substrate

220. The package 210 can be for example a PG-SSO-4-1 (Pin Grid—Shrink Small Outline—four pins in a row) leaded package.

The curvature of the package 210 can be undesirable. It can be caused for instance by material stresses as a result of different coefficients of expansion of a potting compound of the package 210, of the substrate 220 (semiconductor chip) and/or of the (metal) leadframe 230. Besides thermal expansions, swelling of the package 210 as a result of moisture absorption in particular from organic materials (potting compound, adhesive) can also lead to curvature. Moreover, a "cure shrink" (e.g., a lengthy chemical reaction in the potting compound which has the effect that a polymer of the package 210 carries on crosslinking during high-temperature storage and its volume shrinks) can lead to curvature. The curvature can be for example a few micrometers or 1000 times smaller than the size of the package (the curvature is enlarged for elucidation purposes in FIG. 2*a* to FIG. 2*d*).

Figure 2A:
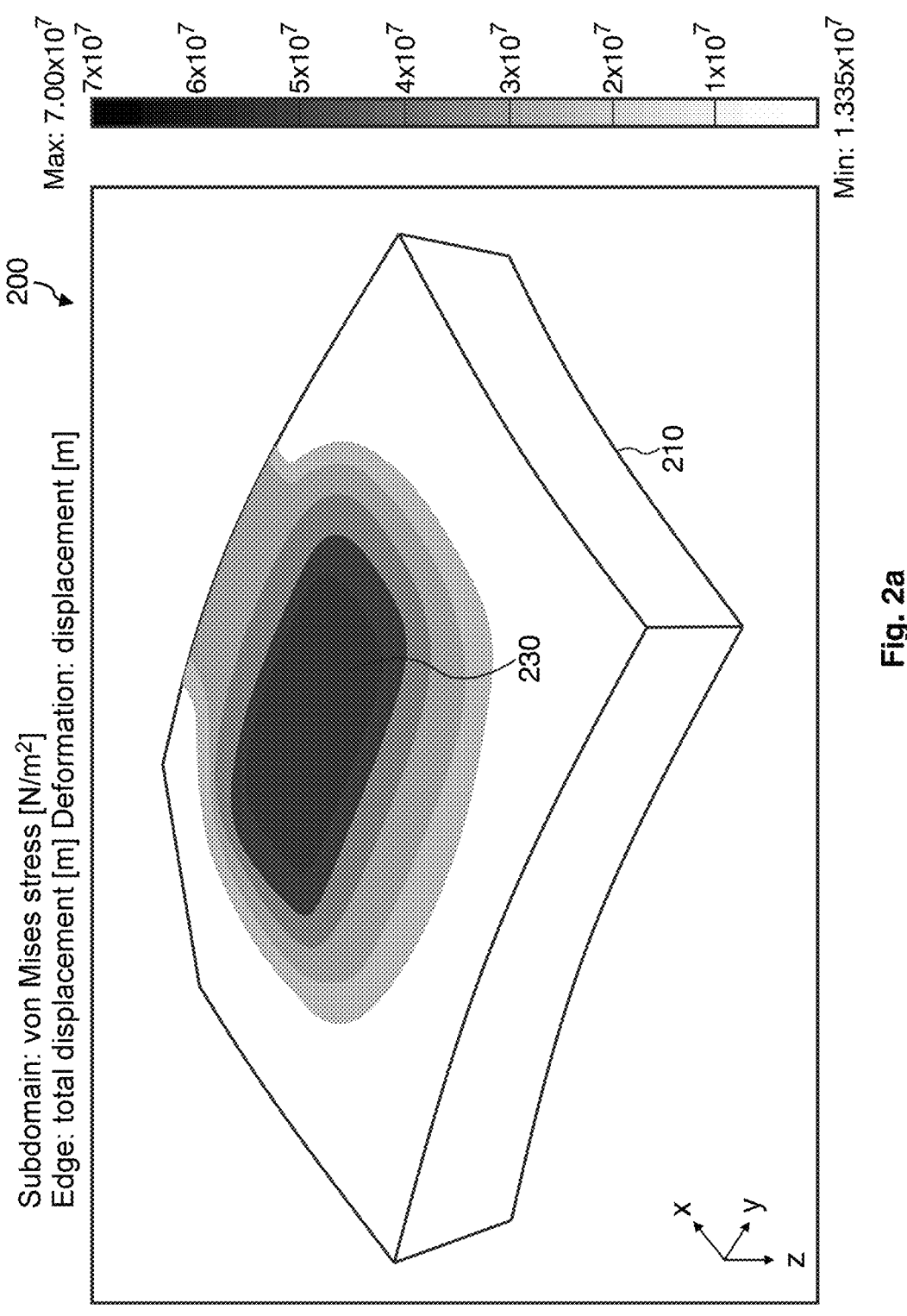
FIGS. 2a-2d show an example distribution of mechanical stress in one example of a semiconductor circuit arrangement.
Figure 2B:
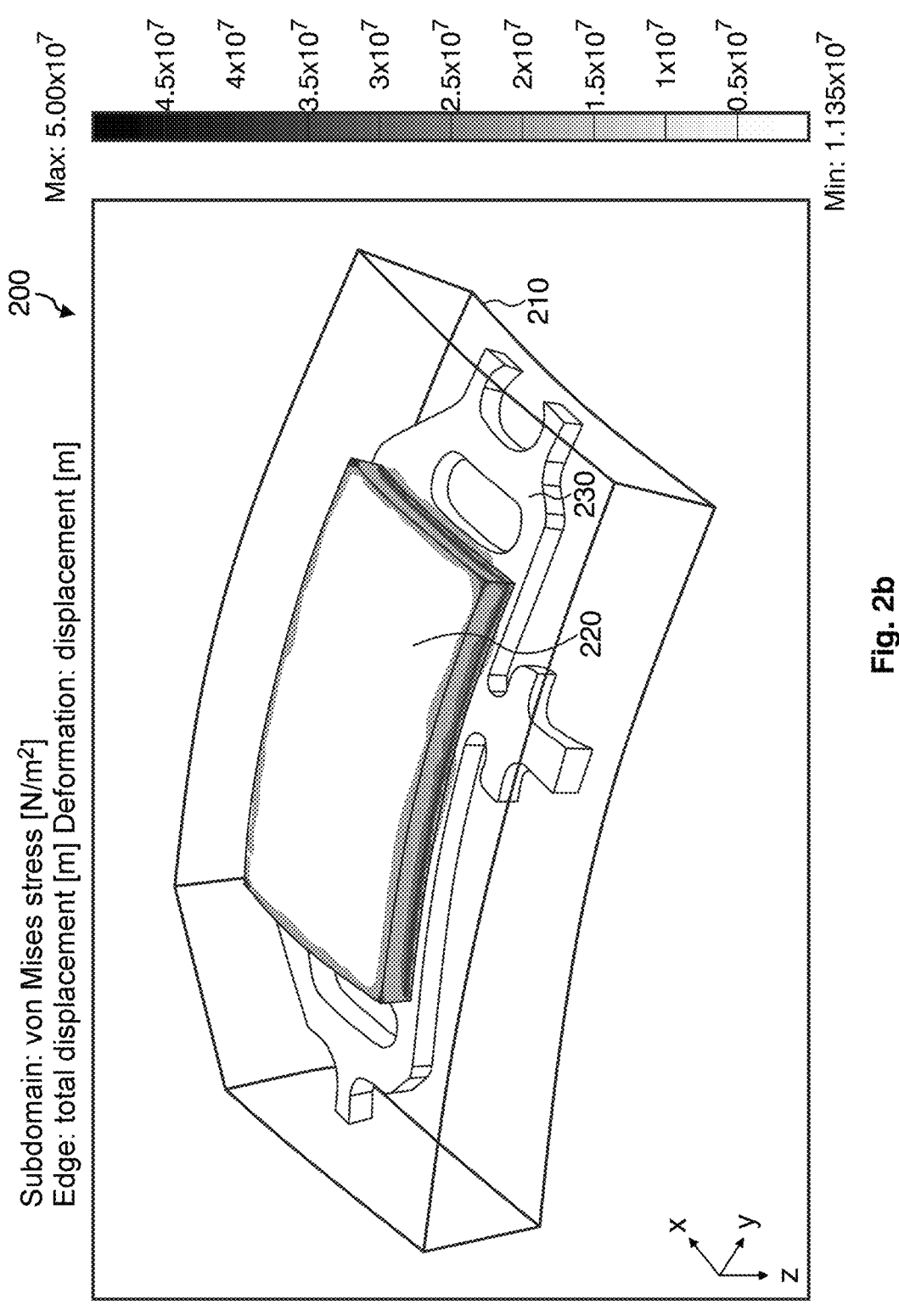

FIG. 2*a* and FIG. 2*b* show the semiconductor circuit arrangement 200 in an oblique view, where FIG. 2*a* shows the distribution of mechanical stress (equivalent stress according to von Mises) in the package 210 and FIG. 2*b* shows the distribution of mechanical stress (according to von Mises) in the substrate 220.

The mechanical stress (in $N/m^2$, newtons per square meter) is highest (approximately $7 \times 10^7 \ N/m^2$) in an elliptical region 230 in the center of the package 210 (FIG. 2*a*) along the x-y-plane. The mechanical stress decreases radially from the center to the end/edge of the package 210 in the x-y-plane. The radial decrease in the mechanical stress has an approximately abrupt profile. At the edge the stress is approximately $1.335 \times 10^7 \ N/m^2$ (pascals).

The mechanical stress is lowest (approximately $1.135 \times 10^8 \ N/m^2$) in the center of the substrate 220 (FIG. 2*b*) and rises abruptly up to approximately $5 \times 10^8 \ N/m^2$ directly at the edge (margins and corners) of the substrate 220.

The different distribution of the mechanical stress in the package 210 (FIG. 2*a*) and in the substrate 220 (FIG. 2*b*) shows that—in contrast to what has been assumed hitherto—the mechanical stress resulting from the deformation of the package 210 is not transferred directly to the substrate 220.

Figure 2C:
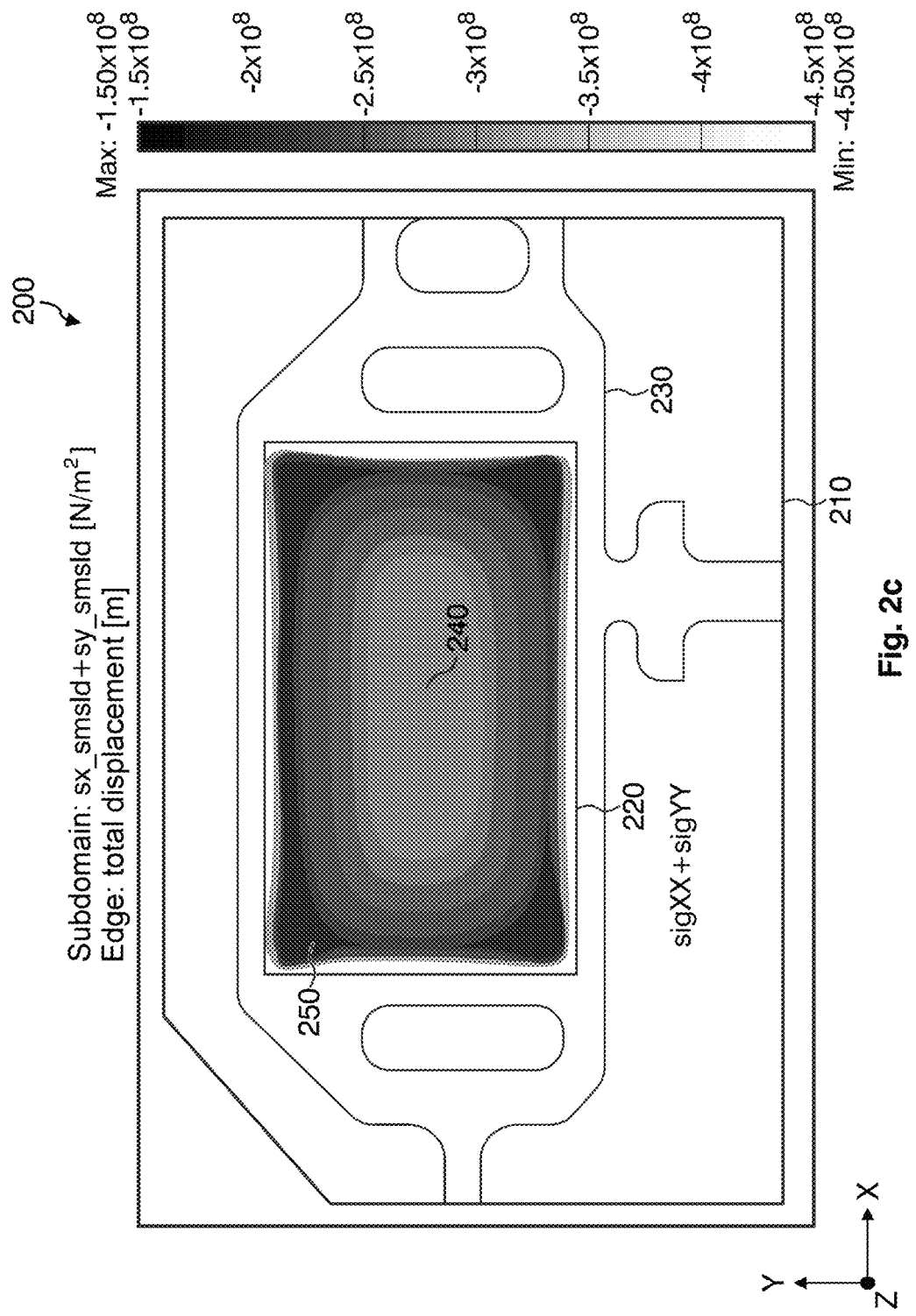
Figure 2D:
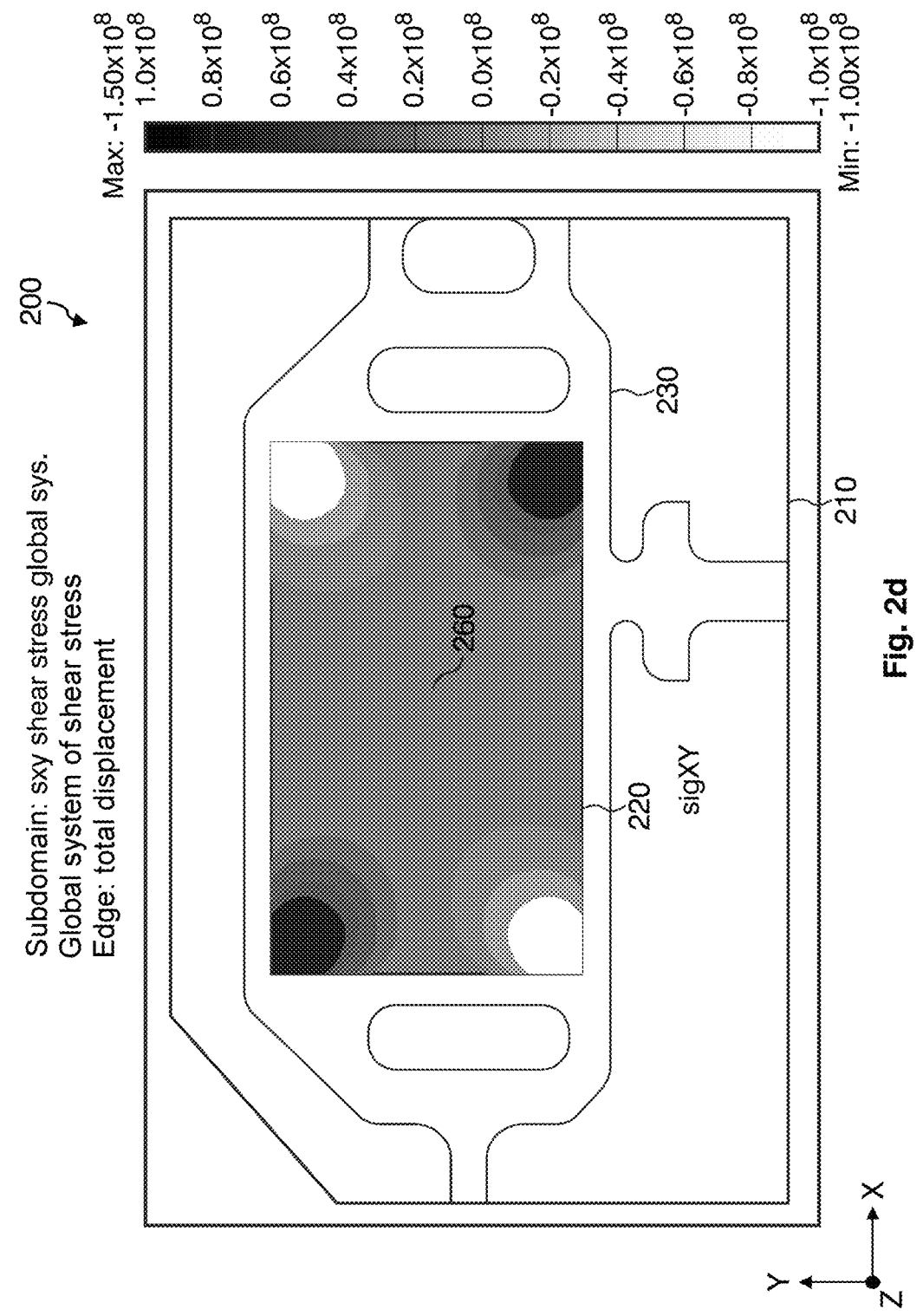

FIG. 2*c* and FIG. 2*d* show the semiconductor circuit arrangement 200 in a plan view (x-y-plane).

FIG. 2*c* shows the distribution of the sum of normal stresses sigXX and sigYY ($\sigma_{xx}$, $\sigma_{yy}$) in the substrate 220 along the x-y-plane. The sum of normal stresses (FIG. 2*c*) is constant (homogeneous) at approximately $-4.5 \times 10^8 \ N/m^2$ over a large portion of the x-y-extent of the substrate 220 in an elliptical region 240 in the center of the substrate 220. At an edge region 250 of the substrate 220, the absolute value of the mechanical stress decreases radially outwardly abruptly (inhomogeneously), to approximately $-1.5 \times 10^8$ $N/m^2$ (outwardly decreasing, relaxing compressive stress).

FIG. 2*d* shows the distribution of the shear stress sigXY ($\sigma_{xy}$) in the substrate 220 along the x-y-plane. The shear stress (FIG. 2*d*) is negligibly small over a large portion of the x-y-extent of the substrate 220 in the center of the substrate 220 and at the edge with the exception of the corners. At the top left and bottom right corners of the substrate 220, the mechanical stress increases outwardly abruptly (to approximately $1 \times 10^8 \ N/m^2$), which corresponds to an increase in the tensile stress. At the top right and bottom left corners of the substrate 220, the mechanical stress decreases outwardly abruptly (to approximately $-1 \times 10^8 \ N/m^2$), which corresponds to an increase in the compressive stress.

The central region (e.g., 240 or 260) of the substrate 220 can be understood as a homogeneous reference region (second region) in which specific components of the mechanical stress tensor are constant (sum of the normal stresses) or negligible (shear stresses). The edge region 250 or the corners of the substrate 220 can be understood as an inhomogeneous target region (first region) in which the mechanical stress measured is non-constant or non-negligible.

Figure 3A:
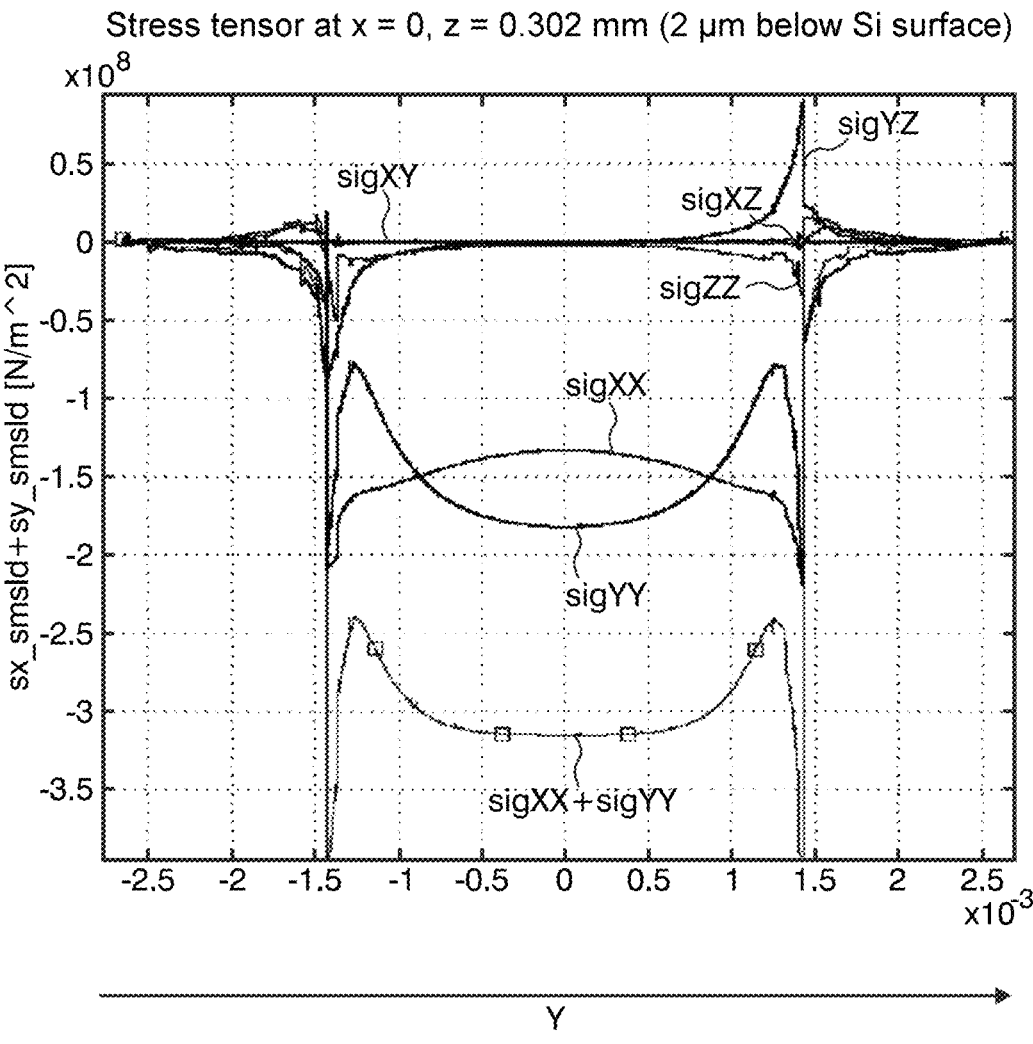
FIGS. 3a 3b show an example profile of mechanical stress in the y-direction and x-direction, respectively, in one example of a semiconductor circuit arrangement.
Figure 3B:
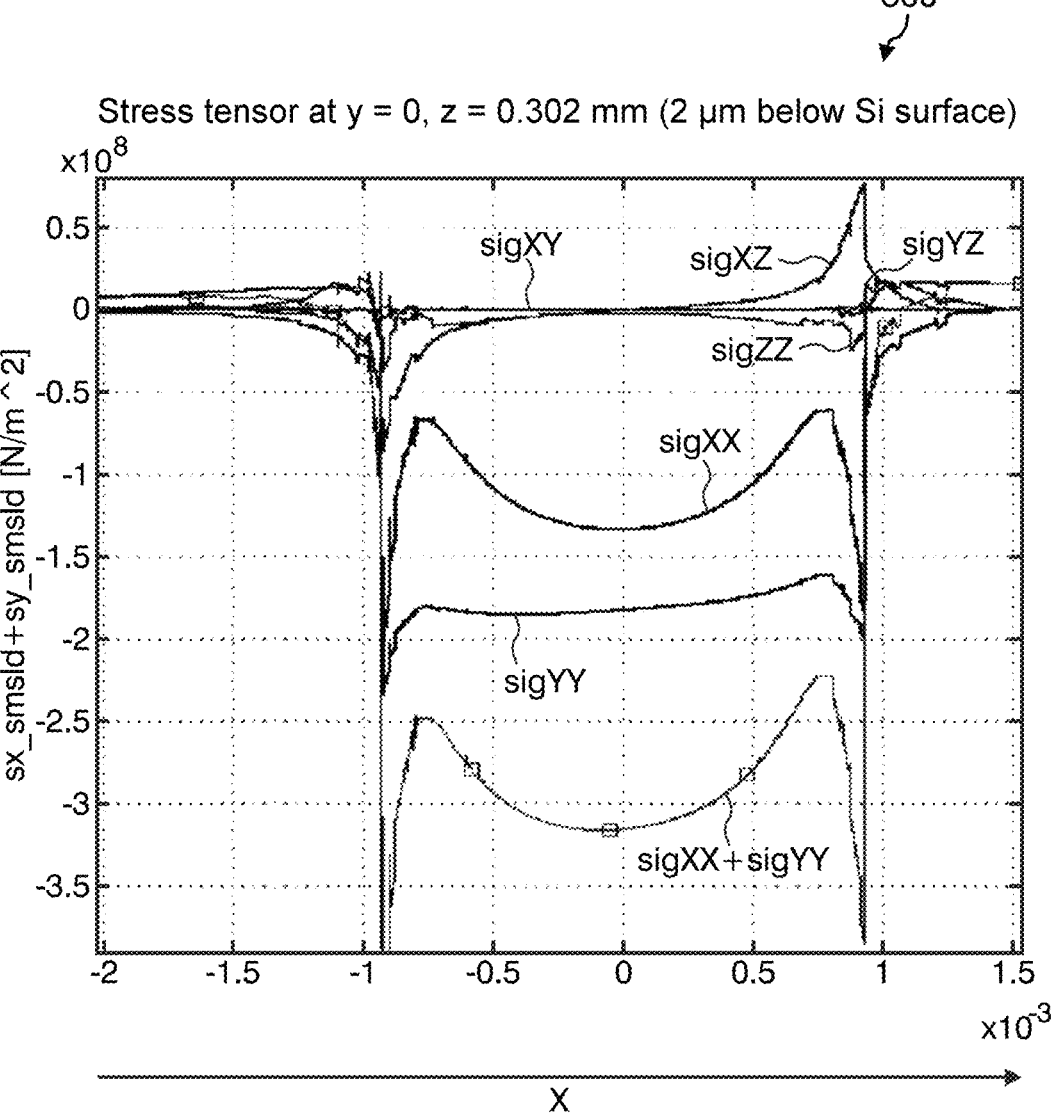

FIG. 3*a* and FIG. 3*b* show an example profile 300 of the mechanical stress (stress tensor) in the substrate 220 in the y-direction (along an x-y-plane 3 micrometers below the chip surface in the z-direction and in the center of the substrate 220 with respect to the x-coordinate) and respectively in the x-direction (along an x-y-plane 3 micrometers below the chip surface in the z-direction and in the center of the substrate 220 with respect to the y-coordinate).

FIG. 3*a* and FIG. 3*b* show the profile 300 of the components of the stress tensor sigXX, sigYY, sigZZ, sigXY, sigYZ, sigXZ and sigXX+sigYY. The normal stress sigZZ has abrupt changes at the beginning and at the end of the profile 300 (in the edge region, in the first region). SigZZ has an approximately constant progression and its absolute value is very small (negligible) in the central region (in the reference region, in the second region). SigXX+sigYY and also the normal stresses sigXX and sigYY have an approximately constant value in the central region and exhibit an abrupt increase in the edge region. The profile 300 additionally shows that the shear stresses are negligible for the most part, apart from relatively small peaks in the edge region. Under certain circumstances, this last would not apply to the corners of the substrate 220 that are not illustrated in FIG. 3*a* and FIG. 3*b*: there for example sigXY can assume high values (absolute values) and therefore be non-negligible.

Referring back to FIG. 1:

It should be noted that, in other example implementations, the substrate 110 can have any different shape than the structure shown in FIG. 1 or FIG. 2*a* to FIG. 2*d* or than a plate-shaped structure as mentioned above. For example, the substrate 110 can be approximately cubic or round.

The regions 120, 130 can generally be distinguishable by different conditions with regard to their mechanical stress. The mechanical stress in the regions 120, 130 can be different for instance if different thermomechanical deformations of the substrate 110 occur in the regions 120, 130 (e.g., on account of different coefficients of thermal expansion in the first region 120 and in the second region 130 or of component parts present at the first and second regions 120, 130) or if hygromechanical or chemical conditions in the regions 120, 130 or in the surroundings thereof differ from one another, which can lead e.g., to different swelling of organic materials (such as adhesives or mold compounds).

In some example implementations, the selection of the regions 120, 130 can be dependent on an expected mechanical stress of the substrate 110 which is caused by surroundings of the substrate 110. By way of example, in a target application, provision can be made for a sensor element to be arranged in the first region near a slot of a leadframe adjacent to the semiconductor circuit arrangement 100 during operation of the semiconductor circuit arrangement 100. An electric current, for instance, can be routed around the slot, which current is to be detected by the sensor element. This structural discontinuity and/or an increased temperature caused by the electric current can cause, in the first region 120 of the substrate 110, an inhomogeneous mechanical stress (relative to a second region 130 further away from the slot).

In the case where the target application comprises a calibration of a sensor element, a desired accuracy of the sensor element can be crucial to whether a region 120 around the sensor element should be regarded as inhomogeneous. By way of example, an increased mechanical stress (in comparison with the reference region 130) at the sensor element of 10 to 100 MPa (megapascals) can lead to an inaccuracy of a measurement of the sensor element of 0.5%; this can be dependent on electrical characteristics (parameters) of the electronic components (for instance resistors, transistors, Hall probes) of the sensor element, which change by approximately 5 to 50% per 1000 MPa under certain circumstances. Depending on the desired accuracy of the sensor element, the mechanical stresses and stress gradients in the first region 120 are to be detected in comparison with the reference region 130, for instance if they differ from the reference region 130 by approximately 10 MPa. In some example implementations, a value (expectable in a target application) of a component of a mechanical stress tensor in the first region 120 is at least 10 MPa greater or less than a (expectable) value of the component of the mechanical stress tensor in the second region 130.

In some example implementations, the first region 120 is spaced apart from the second region 130 at least by a distance corresponding to half a thickness or to a thickness (extent in the z-direction) of the substrate 110. In some example implementations, the first region 120 is arranged at an edge region of the substrate 110 or near a slot of a leadframe. In some example implementations, the second region 130 is arranged around a center of the substrate 110. By way of example, in the case where the first region 120 is inhomogeneous on account of its proximity to an edge region of the substrate 110, the first region 120 is spaced apart from the second region 130 by at least a thickness of the substrate 110. In the case where the first region 120 is inhomogeneous owing to its proximity to a slot of a leadframe, the first region 120 is spaced apart from the second region 130 for example by at least half a thickness of the substrate 110.

Owing to the aforementioned inhomogeneity of the mechanical stress in the first region 120, a measurement of the mechanical stress there can be made more difficult. A goal of the technology described here can therefore be a simplified and/or more accurate determination of the mechanical stress in an inhomogeneous first region 120 of the substrate 110.

A central concept of the technology described here can be a determination of the stress difference between the first region 120 and the second region 130, that is to say of a relative value, from which for example a value of the mechanical stress in the first region 120 can in turn be determined.

The semiconductor circuit arrangement 100 comprises at least two first stress-sensitive elements 121, 122 in the first region 120 of the substrate 110. Furthermore, the semiconductor circuit arrangement 100 comprises at least two second stress-sensitive elements 131, 132 in the second region 130 of the substrate 110.

The stress-sensitive elements 121, 122, 131, 132 can be any electronic elements which have a sufficiently high sensitivity vis-à-vis a mechanical stress to be measured. It should be noted that virtually every electronic component and sensor element have a dimensional characteristic having a certain dependence on mechanical stresses. Accordingly, depending on the target application (e.g., depending on the mechanical stress to be measured), a specific component or sensor element can be used as stress-sensitive element.

In some example implementations, the first stress-sensitive elements 121, 122 and the second stress-sensitive elements 131, 132 each comprise (or are) at least one out of an electrical resistor, a field effect transistor, a Hall sensor element and a bipolar transistor. Electronic components mentioned last can be used for detecting a mechanical stress. They can have different dependencies on the mechanical stress and can accordingly be selected depending on the target application. As an alternative or in addition to electronic components mentioned above, the first stress-sensitive elements 121, 122 and the second stress-sensitive elements 131, 132 can each comprise a pn junction, e.g., a diode.

In some example implementations, the first stress-sensitive elements 121, 122 and the second stress-sensitive elements 131, 132 each comprise at least one out of a lateral resistor, a lateral transistor, a vertical resistor and a vertical transistor. A lateral resistor or transistor can be understood to mean a resistor or transistor, respectively, which is arranged in the substrate 110 such that its main current direction is substantially lateral, that is to say along the x-y-plane of the substrate 110. A vertical resistor or transistor can be understood to mean a resistor or transistor, respectively, which is arranged in the substrate 110 such that its main current direction is substantially vertical, that is to say points in the z-direction.

The first stress-sensitive elements 121, 122 each have an electrical characteristic which is dependent on a first component and a second component of a mechanical stress tensor in the first region 120. The second stress-sensitive elements 131, 132 each have an electrical characteristic which is dependent on a first component and a second component of a mechanical stress tensor in the second region 130. By way of example, their electrical characteristics are dependent on the first component and the second component in such a way that the first component is distinguishable from the second component based on the characteristics.

An electrical characteristic can be a stress-dependent parameter which is characteristic of the stress-sensitive element, for instance an electrical resistance, a current gain (in the case of a bipolar transistor), a current yield (in the case of a MOS transistor), a Hall constant or a charge carrier mobility (in the case of a Hall sensor element), a diode forward voltage (in the case of a diode) or the like. A diode forward voltage can be understood to mean a voltage which arises upon current flow through the diode at the forward-biased pn junction.

A stress tensor can be understood as a second rank tensor which describes a stress state at a specific point of the substrate 100 with the aid of vectors. In some example implementations, the first component corresponds to a (mechanical) in-plane normal stress or to a sum of in-plane normal stresses. A normal stress can be understood as a mechanical stress vector of a Cauchy stress tensor a, the effective direction of which corresponds to the normal direction. In-plane normal stresses can be stress vectors with an effective direction substantially parallel to the x-y-plane. A normal stress can indicate the magnitude of a force (per area) acting perpendicular to a sectional area.

For the case where an electrical resistor is chosen as stress-sensitive element, equation 1 can hold true for the electrical characteristic R of the resistor in accordance with the piezoresistive effect:

$$R = \rho \frac{1}{t} \frac{L}{W} \text{ with } \rho = \frac{1}{qn\mu} \qquad \text{Equation 1}$$

In equation 1 it is assumed by way of example that the resistance element is a resistance strip of length L, width W and thickness t.

In this case: $\rho$ is the resistivity, q is the elementary charge, n is the charge density and $\mu$ is the mobility.

Mechanical stresses can change the resistance in accordance with equation 2:

$$\delta R = \frac{R - R_0}{R_0} = \frac{\Delta R}{R_0} = \frac{\Delta R}{\rho_0} - \frac{\Delta t}{t_0} - \frac{\Delta W}{W_0} + \frac{\Delta L}{L_0} \qquad \text{Equation 2}$$

where R is the resistance under mechanical stress and the variables having the index 0 indicate the values for zero stress. The last three terms on the right-hand side of equation 2 are the purely geometric changes (e.g., the extension) of the resistance strip.

The change in resistivity is attributable to the piezoresistive effect. This change turns out to be much larger than the extension terms in many cases. Resistivity and stress can be represented as second rank tensors, e.g., as six-component vectors as in equation 3:

$$\frac{1}{\rho_0} \begin{pmatrix} \rho_{[100],[100]} - \rho_0 \\ \rho_{[010],[010]} - \rho_0 \\ \rho_{[001],[001]} - \rho_0 \\ \rho_{[010],[001]} \\ \rho_{[100],[001]} \\ \rho_{[100],[010]} \end{pmatrix} = \qquad \text{Equation 3}$$

$$\begin{pmatrix} \pi_{11} & \pi_{12} & \pi_{12} & 0 & 0 & 0 \\ \pi_{12} & \pi_{11} & \pi_{12} & 0 & 0 & 0 \\ \pi_{12} & \pi_{12} & \pi_{11} & 0 & 0 & 0 \\ 0 & 0 & 0 & \pi_{44} & 0 & 0 \\ 0 & 0 & 0 & 0 & \pi_{44} & 0 \\ 0 & 0 & 0 & 0 & 0 & \pi_{44} \end{pmatrix} \cdot \begin{pmatrix} \sigma_{[100],[100]} \\ \sigma_{[010],[010]} \\ \sigma_{[001],[001]} \\ \sigma_{[010],[001]} \\ \sigma_{[100],[001]} \\ \sigma_{[100],[010]} \end{pmatrix}$$

In equation 3, resistivity and stress are indicated in the coordinate system of the single crystal. They are mathematically related to one another by way of the piezoresistive coefficients i,j. For lightly n- and p-doped ($<10^{18}/cm^3$, cubic centimeter) monocrystalline silicon at room temperature, the following hold true for example:

$\pi^n_{11} = 102.2\%/GPa$ (gigapascals), $\pi^n_{12} = 53.4\%/GPa$,
$\pi^n_{44} = 13.6\%/GPa$
$\pi^p_{11} = 6.6\%/GPa$, $\pi^n_{12} = 1.1\%/GPa$, $\pi^m_{44} = 138.1\%/GPa$ The piezocoefficients can be dependent on the doping and the temperature. By way of example, the piezoresistive coefficients can become smaller with higher doping and rising temperature (by approximately $-0.3\%/°$ C.). The conversion from the crystal coordinate system to the reference coordinate system of the semiconductor circuit arrangement 100 can yield equations 4 to 6 (disregarding the extension terms) for (100) silicon:

$$\delta R_x \cong \frac{\pi_{11} + \pi_{12} - \pi_{44}}{2} \sigma_{xx} + \frac{\pi_{11} + \pi_{12} + \pi_{44}}{2} \sigma_{yy} + \pi_{12}\sigma_{zz} \qquad \text{Equations 4 to 6}$$

$$\delta R_y \cong \frac{\pi_{11} + \pi_{12} + \pi_{44}}{2} \sigma_{xx} + \frac{\pi_{11} + \pi_{12} - \pi_{44}}{2} \sigma_{yy} + \pi_{12}\sigma_{zz}$$

$$\delta R_z \cong \pi_{12}(\sigma_{xx} + \sigma_{yy}) + \pi_{11}\sigma_{zz}$$

The x-direction is identical to the direction [−110] of the monocrystalline silicon, the y-direction is identical to [−1-10], and the z-direction is identical to [001]. Rx and Ry are resistances of lateral resistors, the current flowing in the x-direction and y-direction, respectively, of the substrate 110, while Rz is a resistance of a vertical resistor, in which the current flows perpendicular to the chip surface in the z-direction.

Since, in many sensor elements, a sensitivity is present equally from the normal stress in the x-direction and also in the y-direction (that is to say that they react similarly to mechanical normal stresses $\sigma_{xx}$ and $\sigma_{yy}$ or can be adapted in terms of their layout such that they react identically to the loads), a characteristic of the stress-sensitive elements 121, 122, 131, 132 which indicates the sum of the in-plane normal stresses can be sufficient, for instance for calibrating such a sensor element. A further resolution with respect to individual in-plane normal stresses is then potentially not necessary. In many semiconductor chips, the in-plane normal stresses can be relevant to the target application thereof since owing to the single chip frequently being implemented in a lateral shape, mechanical stresses principally act along the x-y-plane.

In the abovementioned example of the resistor as stress-sensitive element 121, 122, 131, 132, an L-layout with $R_x$ and $R_y$ being electrically connected in series or in parallel can result in a characteristic which indicates the sum of normal stresses in accordance with equation 7:

$$\delta R_L \cong \frac{\pi_{11} + \pi_{12}}{2} (\sigma_{xx} + \sigma_{yy}) + \pi_{12}\sigma_{zz} \qquad \text{Equation 7}$$

An L-layout (L-geometry) can be understood to mean a mutually perpendicular arrangement of two electronic components. For example, two resistance strips having the same length-to-width ratio (L/W) can be arranged (perpendicular to one another) in the L-layout. An L-layout can be configured for example as described in M. Motz, U. Ausserlechner: "Electrical compensation of mechanical stress drift in precision analog circuits" (DOI: 10.1007/978-3-319-41670-0_16).

In some example implementations, the second component corresponds to a shear stress or to an out-of-plane normal stress. A shear stress can be understood as a stress vector of the Cauchy stress tensor $\sigma$, the effective direction of which is perpendicular to the normal direction. A shear stress can indicate the magnitude of a force (per area) acting parallel to the sectional area (in the sectional area). An out-of-plane normal stress can be a stress vector with an effective direction substantially perpendicular to the x-y-plane. Shear stresses and out-of-plane normal stresses can assume larger values (absolute values) for example in inhomogeneous regions 120 of the substrate 110 and can therefore be of particular relevance to examples of the present implementation. Shear stresses can assume larger values for example in corners of the substrate 110, whereas out-of-plane normal stresses can assume larger values for example in edge regions of the substrate 110.

In some example implementations, a value of the second component can be negligible in the second region 130. By way of example, a shear stress and/or an out-of-plane normal stress can be negligible in the second region 130 (for instance within the chip).

In some example implementations, the respective electrical characteristic of each of the first stress-sensitive elements 121, 122 has a dependence on the first component and the second component which substantially corresponds to a dependence on the first component and the second component of the electrical characteristic of a respective second stress-sensitive element 131, 132. For example, one of the first stress-sensitive elements 121 can have an electrical characteristic which has a dependence on the first component and/or the second component which is similar to that of the electrical characteristic of one of the second stress-sensitive elements 131. The other of the first stress-sensitive elements 122 can have an electrical characteristic which has a dependence on the first component and/or the second component which is similar to that of the electrical characteristic of the other of the second stress-sensitive elements 132. Reference values for the stress difference in the first and second regions 120, 130 can be determined more easily as a result.

In some example implementations, the stress-sensitive elements 121 and 131 (or 122 and 132) are lateral resistors having substantially identical orientations (main flow direction) along the x-y-plane. A sufficiently similar (ideally identical) dependence on the first and/or second component of the mechanical stress in the respective region 120, 130 can thus be assumed.

In some example implementations, the electrical characteristic of one of the first stress-sensitive elements 121 has a dependence on the first component and the second component which differs from a dependence on the first component and the second component of the electrical characteristic of the respectively other of the first stress-sensitive elements 122, and wherein the electrical characteristic of one of the second stress-sensitive elements 131 has a dependence on the first component and the second component which differs from a dependence on the first component and the second component of the electrical characteristic of the respectively other of the second stress-sensitive elements 132. As a result, (relative values for) the first component and the second component can be detected in a distinguishable manner.

An equation of an equation system from which it is possible to determine values for the first component and the second component in the first region 120 in comparison with the second region 130 can be formulated for example for the electrical characteristic of each of the stress-sensitive elements 121, 122, 131, 132. For example, the semiconductor circuit arrangement 100 can comprise a number of stress-sensitive elements in each case in the first region 120 and in the second region 130 that is at least equal to the number of components to be determined independently of one another in the stress tensor (or variables derived therefrom such as a sum of normal stresses) in the first region 130. Depending on the number of stress-sensitive elements, a number of ≥2 components of the stress tensor (or derived variables) can thus be determined independently of one another.

In some example implementations, one of the first stress-sensitive elements 121 is a lateral resistor and the other of the first stress-sensitive elements 122 is a vertical resistor (or a lateral resistor with different orientation). In example implementations mentioned last, it is likewise possible for example for one of the second stress-sensitive elements 131 to be a lateral resistor and for the other of the second stress-sensitive elements 132 to be a vertical resistor (or a lateral resistor with different orientation).

It should be noted that the stress-sensitive elements in the first and second regions 120, 130 need not necessarily correspond to one another in terms of their type (that is to say in terms of the dependence on specific components of the mechanical stress). For example, the functional relationships between different types of electronic components or sensor elements (that is to say the differences in the effect of the mechanical stress on the respective electrical characteristic of different components or sensor elements) can be known or determinable. This functional relationship can contribute to the solution to the abovementioned equation system even if different stress-sensitive elements are chosen in the first region 120 and in the second region 130.

The semiconductor circuit arrangement 100 furthermore comprises a measuring circuit 140. The latter is arranged at the top left edge of the substrate 110 merely by way of example in FIG. 1. In other example implementations, the measuring circuit 140 can be arranged differently than in FIG. 1, for example in the first region 120 or in the second region 130.

The measuring circuit 140 is configured, based on the respective electrical characteristics of the first stress-sensitive elements 121, 122 and of the second stress-sensitive elements 131, 132, to determine a first stress difference between the first component in the first region 120 and the first component in the second region 130 and to determine a second stress difference between the second component in the first region 120 and the second component in the second region 130.

The measuring circuit 140 can receive or generate by measurement for example a signal indicative of the electrical characteristics or of a comparison value of the characteristics in the first region 120 and in the second region 130. By way of example, the measuring circuit 140 can tap off electrical voltage differences at an output of the stress-sensitive elements 121, 122, 131, 132, the differences being indicative of the electrical characteristics of the stress-sensitive elements. The measuring circuit 140 can comprise for example a Wheatstone measuring bridge.

The measuring circuit 140 can comprise for example a processing circuit for processing the signal, for instance for solving an equation system for determining the mechanical stress in the first region 120. The measuring circuit 140 can comprise for example processors, control units, field programmable logic arrays (F)PLAs, field programmable gate arrays (F)PGAs, graphics processor units (GPUs), application-specific integrated circuits (ASICs), integrated circuits (ICs) or systems-on-a-chip (SoCs), which are programmed for evaluating the signal.

The semiconductor circuit arrangement 100 can simplify a stress measurement since it can manage without absolute measurements (measurement of the total value) of the mechanical stress. The semiconductor circuit arrangement 100 can enable the stress determination by measurement of relative values (stress gradients) between two different regions 120, 130 of a substrate 110, which can reduce a complexity of the measuring circuit. The semiconductor circuit arrangement 100 can determine stress differences between the first and second regions 120, 130 of a semiconductor chip 110 for example by comparing stress-dependent parameters of devices (e.g., electronic components or sensor elements) of the same type in the first and second regions 120, 130. For example, the semiconductor circuit arrangement 100 can determine a difference of $\sigma_{xx}+\sigma_{yy}$ and a difference of $\sigma_{zz}$ between the first and second regions 120, 130 in order to ascertain the mechanical stress in the first region 120.

In some example implementations, the measuring circuit 140 is configured to determine a value of the first component in the first region 120 and/or a value of the second component in the first region 120 based on the first stress difference and/or the second stress difference, respectively. By way of example, the first component and the second component in the second region 130 can be known, negligible or easily determinable. For example, the out-of-plane normal stress $\sigma_{zz}$ or the shear stress $\sigma_{xy}$ in the second region 130 can be assumed to be negligible, under certain circumstances, if the second region 130 is situated in a central region of a laterally extended substrate 100. The measuring circuit 140 can then determine a total value of $\sigma_{zz}$ or $\sigma_{xy}$ in the first region 120 based on the stress difference.

In some example implementations, the semiconductor circuit arrangement 100 comprises at least one third (optional) stress-sensitive element 150 in the second region 130. In cases mentioned last, the third stress-sensitive element 150 has an electrical characteristic which is dependent on the first component of the mechanical stress tensor in the second region 130. The measuring circuit 140 can furthermore be configured to determine a value of the first component (and/or of the second component) in the second region 130 based on the electrical characteristic of the third stress-sensitive element 150 and to determine the value of the first component (and/or of the second component) in the first region 120 furthermore based on the value of the first component in the second region 130.

By way of example, the electrical characteristic of the third stress-sensitive element 150 can have a dependence on the first component which is different than the electrical characteristic of one of the first stress-sensitive elements 121, 122. From a difference between the electrical characteristics of the third stress-sensitive element 150 and one of the first stress-sensitive elements 121, 122, with knowledge of the physical relationships between their characteristics and the change in the mechanical stress, it is possible to deduce a value of the first component in the second region 130.

For example, the third stress-sensitive element 150 and one of the first stress-sensitive elements 121, 122 can be embodied in an L-layout as electrically parallel or serial lateral resistors with different orientations (e.g., orientations perpendicular to one another) or as orthogonal MOSFETs (Metal Oxide Semiconductor Field-Effect Transistors). Orthogonal MOSFETs can be understood to mean MOSFETs whose current flow directions in the channel are perpendicular to one another, that is to say whose channels are perpendicular to one another.

In some example implementations, the semiconductor circuit arrangement 100 furthermore comprises a (optional) sensor element 160 in the first region 120. The measuring circuit 140 can furthermore be configured to determine a change in sensitivity of the sensor element 160 caused by the first component in the first region 120 and the second component in the first region 120, based on the first stress difference and the second stress difference. In some example implementations, the sensor element 160 is a Hall sensor element. A Hall sensor element can be understood to mean any electronic component in which the Hall effect is used, e.g., Hall plates or vertical Hall devices or Corbino disks.

Mechanical stress can change for instance the Hall coefficient of a Hall sensor element, which can lead to a change in the current-related magnetic sensitivity of the sensor element 160. Hall plates can have for example a magnetic sensitivity according to equation 8:

$$Si=dVout/dBz/Iin \qquad \text{Equation 8}$$

where dVout: change in Hall voltage, dBz: change in magnetic field, Iin: current intensity of the supply current through the Hall plate. The sensitivity can be dependent on the mechanical stress as follows:

$$Si=Si0(T)\cdot(1+P12\cdot(sigXX+sigYY)+P11\cdot sigZZ) \qquad \text{Equation 9}$$

where Si0(T): stress-independent sensitivity, P12, P11: piezocoefficients: sigXX, sigYY, sigZZ: normal stresses.

A determination of the change in sensitivity can be used for instance for the calibration of the sensor element 160. In some example implementations, the measuring circuit 140 is configured to correct the change in sensitivity based on at least one out of controlling a supply current of the sensor element 160, controlling an amplifier coupled to the sensor element 160, and adapting a signal that is output by the sensor element 160 and subsequently digitized. The change in sensitivity can generally be compensated for in analog fashion, digitally or by way of mixed-signal processing.

In some example implementations, the semiconductor circuit arrangement 100 comprises a first temperature-sensitive element (not shown) in the first region 120. In this case, the first temperature-sensitive element has an electrical characteristic which is dependent on a temperature in the first region 120. In example implementations mentioned last, the semiconductor circuit arrangement 100 furthermore comprises a second temperature-sensitive element (not shown) in the second region 130. In this case, the second temperature-sensitive element has an electrical characteristic which is dependent on a temperature in the second region 130. The measuring circuit 140 can furthermore be configured, based on the respective electrical characteristic of the first temperature-sensitive element and of the second temperature-sensitive element, to determine a temperature difference between the first region 120 and the second region 130 and to determine the first stress difference and the second stress difference based on the temperature difference (e.g., taking account of the temperature difference).

The temperature-sensitive elements can be for example pn junctions or MOSFET channels with weak inversion, which generate voltages or currents with a (very accurately) defined temperature response in a bandgap circuit.

The characteristics of the stress-sensitive elements 121, 122, 131, 132 can be corrupted by the temperature difference. Furthermore, the characteristics of the temperature-sensitive elements can be corrupted by the stress differences. Compensation of the temperature difference for the stress-sensitive elements 121, 122, 131, 132 and the stress difference for the temperature-sensitive elements makes it possible to increase a measurement accuracy of both the temperature measurement and the stress measurement.

In some example implementations, the respective electrical characteristic of each of the first stress-sensitive elements has a dependence on a temperature in the first region which substantially corresponds to a dependence on a temperature in the second region of the electrical characteristic of a respective second stress-sensitive element.

The procedure adopted during compensation can be as follows: three output signals arise from two characteristics of the first stress-sensitive elements 121, 122 and the characteristic of the temperature-sensitive element (temperature sensor). Three unknowns dsig1, dsig2, dT (stress and temperature differences) can be assumed. The values can be derived from the following equation system (equations 10 to 12):

$$\text{Signal element } 121 = c1 \cdot dsig1 + c2 \cdot dsig2 + c3 \cdot dT$$

$$\text{Signal element } 122 = c4 \cdot dsig1 + c5 \cdot dsig2 + c6 \cdot dT$$

$$\text{Signal temperature sensor} = c7 \cdot dsig1 + c8 + dsig2 + c9 \cdot dT$$
$$\text{Equations 10 to 12}$$

where c1 to c9: coefficients which are largely independent of the mechanical stress components sig1, sig2 and the temperature T. For example, a change in sig1 and/or sig2 by 100 MPa and/or a change in the temperature T by 100° C. can change the coefficients by less than 20%.

Figure 4:
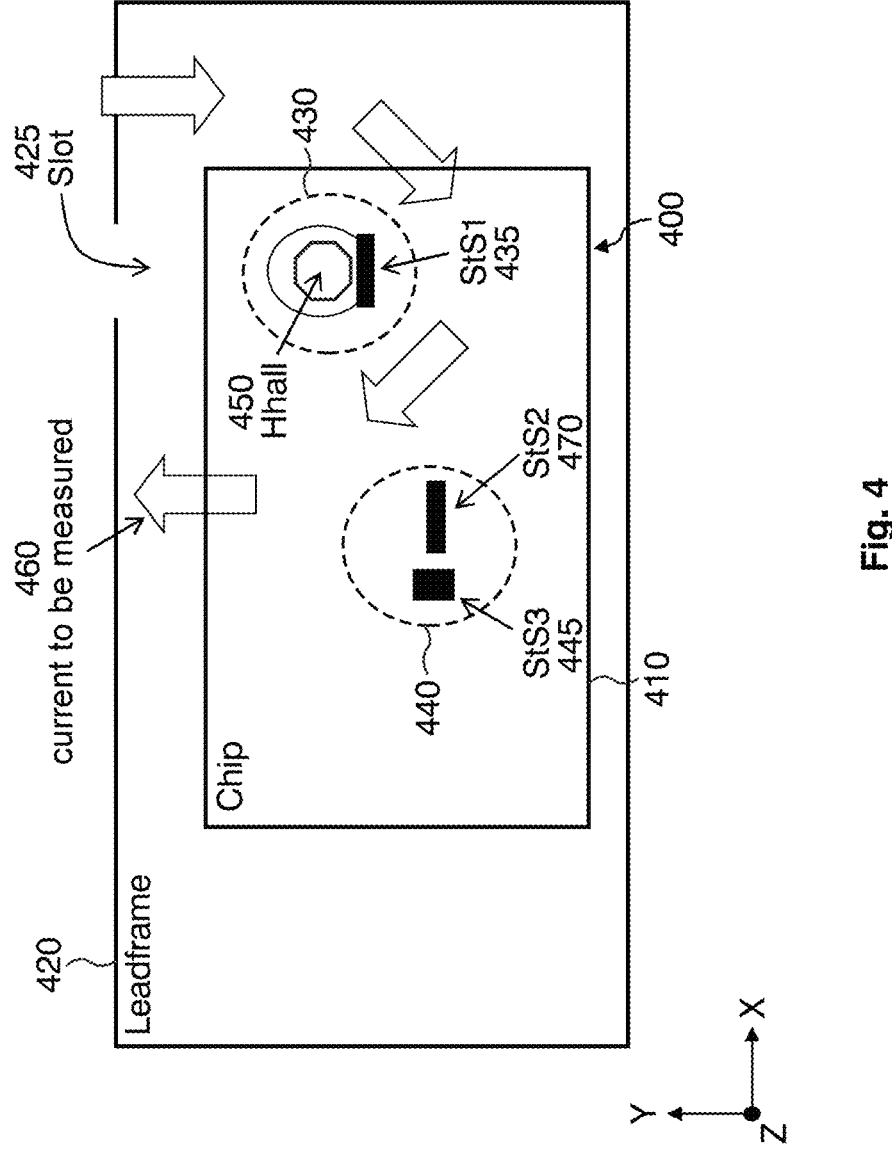
FIG. 4 shows a further example of a semiconductor circuit arrangement according to the implementation.

FIG. 4 shows a further example implementation of a semiconductor circuit arrangement 400 according to the implementation.

The semiconductor circuit arrangement 400 comprises a substrate 410 mounted on a leadframe 420. The substrate 410 has a first region 430 and a second region 440. The first region 430 surrounds a slot 425 of the leadframe. The second region 440 is arranged centrally on the substrate 410.

The semiconductor circuit arrangement 400 furthermore comprises two first stress-sensitive elements 435 (StS1) in the first region 430 of the substrate 410. The first stress-sensitive elements 435 each have an electrical characteristic which is dependent on a first component and a second component of a mechanical stress tensor in the first region 430.

The semiconductor circuit arrangement 400 furthermore comprises two second stress-sensitive elements 445 in the second region 440 of the substrate 410. The second stress-sensitive elements 445 each have an electrical characteristic which is dependent on a first component and a second component of a mechanical stress tensor in the second region 440.

Furthermore, the semiconductor circuit arrangement 400 comprises a measuring circuit (not shown in FIG. 4) configured, based on the respective electrical characteristics of the first stress-sensitive elements 435 and of the second stress-sensitive elements 445, to determine a first stress difference between the first component in the first region 430 and the first component in the second region 440 and to determine a second stress difference between the second component in the first region 430 and the second component in the second region 440.

The semiconductor circuit arrangement 400 furthermore comprises a sensor element 450 (HHall) in the first region 430. The measuring circuit is configured to determine a change in sensitivity of the sensor element 450 caused by the first component in the first region 430 and the second component in the first region 430, based on the first stress difference and the second stress difference. In the example shown in FIG. 4, the sensor element 450 is a Hall sensor element.

The semiconductor circuit arrangement 400 is for example a magnetic current sensor chip with an integrated busbar. A target application of the semiconductor circuit arrangement 400 can be for instance a measurement of a current 460 (current to be measured) that flows through the leadframe 420. The current 460 generates a magnetic field that is measured by the magnetic field sensor 450 in a chip 410 adhesively bonded onto the leadframe 420. In this case, the leadframe 420 is for example a metal sheet having small structural irregularities such as slots 425 which conduct the current 460 in a particularly advantageous manner for the measurement, for instance in order to generate a strong magnetic field at the magnetic field sensor 450. The current density is increased at the tip of the gap 425, which results in a strong magnetic field on the Hall plate 450. However, the tip of the gap also exerts an inhomogeneous mechanical stress on the chip 410 in the vicinity of the gap 425 (in the first region 430), in particular in the vicinity of the tip of the gap on which the Hall plate 450 bears. For the example shown in FIG. 4 it is assumed that the chip 410 has a thin structure.

Inhomogeneous mechanical stresses in the first region 430 can be caused by the tip of the gap 425, and then affect the magnetic field sensors 450, namely in the form of a change in the magnetic sensitivity thereof. This can lead to a calibration error of 0.1 to 10%, typically 2%.

Stress-sensitive elements 435, 445 are therefore mounted in the vicinity of the tip (in the first region 430) and at a relatively large distance from the tip (in the second region 440). The stress-sensitive elements 435 and 445 can be for instance vertical resistors Rv, lateral resistors in an L-geometry RL, polysilicon resistors in an L-geometry RpL, a Hall plate or a bipolar diode (e.g., base-emitter of a vertical PNP transistor) VPNP.

For the electrical characteristics of the stress-sensitive elements 434, 445, the following can hold true in accordance with equations 13 to 16:

$$Rv = Rv0(T) \cdot (1 + piv \cdot (sigXX + sigYY) + pivz \cdot sigZZ)$$

$$RL = RL0(T) \cdot (1 + piL \cdot (sigXX + sigYY) + piLz \cdot sigZZ)$$

$$RpL = RpL0(T) \cdot (1 + pipL \cdot (sigXX + sigYY) + pipLz \cdot sigZZ)$$

$$Si = Si0(T) \cdot (1 + P12 \cdot (sigXX + sigYY) + P11 \cdot sigZZ) \quad \text{Equations 13 to 16}$$

where Rv, RL, RpL are the resistance values of the stress-sensitive elements 435, 445; Si is the sensitivity of the Hall element 450; Rv0(T), RLo(T), RpLo(T), Si0(T) are resistance and sensitivity values in the case of reference stress and reference temperature; piv, pivz, piL, piLz, pipL, pipLz, P12, P11 are piezocoefficients; sigXX+sigYY is the first component of the stress tensor, and sigZZ is the second component of the stress tensor.

The output signal of the Hall plate 450 is described by equation 17:

$$Vout = Si \cdot Ubg / R3 \quad \text{Equation 17}$$

where Ubg is a signal generated by a bandgap circuit having negligible mechanical stress dependence, and R3 is a resistance with a known stress dependence that is situated in the second region 440.

The sensitivity can result from equation 18:

$$Si = (Si1 / Si3) \cdot Si3 \quad \text{Equation 18}$$

where:

$$Si1 = Si0(T) \cdot (1 + P12 \cdot (sigXX1 + sigYY1) + P11 \cdot sigZZ1)$$

$$Si3 = Si0(T) \cdot (1 + P12 \cdot (sigXX3 + sigYY3) + P11 \cdot sigZZ3)$$

To put it another way, Si1 is the magnetic sensitivity of the Hall plate 450 in the first region 430, and Si3 is the magnetic sensitivity of a hypothetical Hall plate in the second region

440 (which is sufficiently far away from the tip of the gap 425). In the first region 430, the mechanical stress is inhomogeneous and has an appreciable sigZZ component, while in the second region 440, the mechanical stress is homogeneous and has a negligible sigZZ component (sigZZ3=0). Index 1 and index 3 in the equations are intended to indicate hereinafter an arrangement in the first region 430 and second region 440, respectively.

Furthermore, the following can be assumed for the output voltage:

$$\text{Vout}=(Si1/Si3) \cdot Si3 \cdot Ubg/R3 = (Si1/Si3) \cdot \text{Vout'} \qquad \text{Equation 19}$$

where:

$$\text{Vout'}=Si3 \cdot Ubg/R3$$

The hypothetical (imaginary) output voltage Vout' can be assumed to be a voltage which could be output by a hypothetical Hall plate in the second region 440 if the magnetic field acting on it were the same as that acting on the Hall plate 450.

The mechanical stress state in the second region 440 is more easily determinable than in the first region 430 since only a homogeneous sigXX+sigYY acts there. The mechanical stress state in the second region 440 can be determined (and compensated for) by conventional methods, from which a compensated output voltage Vout' compensated can in turn be determined. One example of such a conventional method is the use of a circuit for calibrating mechanical stress drift, e.g., as in M. Motz, U. Ausserlechner: "Electrical compensation of mechanical stress drift in precision analog circuits" (DOI: 10.1007/978-3-319-41670-0_16).

For example, in the example implementation shown in FIG. 4, the semiconductor circuit arrangement 400 furthermore comprises a third stress-sensitive element 470 in the second region 440. The third stress-sensitive element 470 has an electrical characteristic which is dependent on the first component of the mechanical stress tensor in the second region 440.

The measuring circuit of the semiconductor circuit arrangement 400 is furthermore configured to determine a value of the first component in the second region 440 based on the electrical characteristic of the third stress-sensitive element 470 and to determine the value of the first component in the first region 430 furthermore based on the value of the first component in the second region 440.

Furthermore, the compensated output voltage can result from equation 20:

$$\text{Vout'compensated}=\text{Vout'} \cdot (1-EPC \cdot (sigXX3+sigYY3)) \qquad \text{Equation 20}$$

where EPC is the effective piezocoefficient of the hypothetical Hall plate for the dependence on sigXX+sigYY of the sensitivity Si3 in the second region 440. An effective piezocoefficient can be understood to mean a combined coefficient that combines the stress dependence of the Hall plate, a stress dependence of a current source that supplies the Hall plate with current, and optionally further stress influence terms. The effective piezocoefficient can be determined for example according to the methods from M. Motz, U. Ausserlechner: "Electrical compensation of mechanical stress drift in precision analog circuits" (DOI: 10.1007/978-3-319-41670-0_16).

The dependence of the sensitivity ratio Si1/Si3 on the mechanical stress can follow from equation 21:

$$Si1/Si3=(1+P12 \cdot (sigXX1+sigYY1)+P11 \cdot sigZZ1)/(1+P12 \cdot (sigXX3+sigYY3)) \approx 1+P12 \cdot (sigXX1-sigXX3+sigYY1-sigYY3)+P11 \cdot sigZZ1 \qquad \text{Equation 21}$$

It would accordingly be necessary to determine the stress difference of sigXX+sigYY (first component of the stress tensor) between the first region 430 and the second region 440 and the stress difference of sigZZ (second component of the stress tensor) between the two regions 430, 440. The technology described here can make it possible to determine the mechanical stress in the first region 430 with the aid of such a relative measurement. A relative measurement can be easier to realize than an absolute measurement of the mechanical stress (particularly if the stress tensor in the first region 430 is highly inhomogeneous) since the stress-dependent parameters (characteristics) of components (devices) of the same type can easily be compared at different positions.

By way of example, for the purpose mentioned last, it is possible to determine the resistance relations in accordance with equations 22 and 23:

$$Rv1/Rv3 = \qquad\qquad \text{Equations 22 and 23}$$
$$(1 + piv \cdot (sigXX1 + sigYY1) + pivz \cdot sigZZ1)$$
$$/(1 + piv \cdot (sigXX3 + sigYY3)) \approx$$
$$1 + piv \cdot (sigXX1 - sigXX3 + sigYY1 - sigYY3) +$$
$$pivz \cdot sigZZ1)$$
$$RL1/RL3 = (1 + piL \cdot (sigXX1 + sigYY1) + piLz \cdot sigZZ1)$$
$$/(1 + piL \cdot (sigXX3 + sigYY3)) \approx$$
$$1 + piL \cdot (sigXX1 - sigXX3 + sigYY1 - sigYY3) + piLz \cdot sigZZ1$$

where Rv1 and Rv3 are values of substantially identical vertical resistors in the first region 430 and in the second region 440, respectively; RL1 and RL3 are values of substantially identical lateral resistors in the L-layout in the first region 430 and in the second region 440, respectively. The measuring circuit can determine the resistance quotients from equations 22 and 23 using known circuitry means. For example, the measuring circuit can comprise a bandgap circuit which can generate a current at Rv3 and cause this current to flow through Rv1 in a mirrored manner: the voltage across Rv1 would then be proportional to Rv1/Rv3.

Alternatively, the measuring circuit can comprise an amplifier which has a temperature-constant bandgap voltage present at its input and which is configured in such a way that its gain ratio is determined by Rv1/Rv3. The resistances Rv1 and Rv3 can preferably be technologically identical, as a result of which temperature-dictated changes in resistance cancel one another out. The semiconductor circuit arrangement 400 can thus increase an accuracy of the determination of stress differences between Rv1 and Rv3.

The following equation system can arise from the above:

$$Rv1/Rv3-1 \approx piv \cdot dsig + pivz \cdot sigZZ1$$

$$RL1/RL3-1 \approx piL \cdot dsig + piLz \cdot sigZZ1 \qquad \text{Equations 24 and 25}$$

where dsig=sigXX1−sigXX3+sigYY1−sigYY3.
When solved with respect to dsig, equation 26 can arise:

$$dsig=(piLz \cdot (Rv1/Rv3-1)-pivz \cdot (RL1/RL3-1))/(piv \cdot piLz-piL \cdot pivz) \qquad \text{Equation 26}$$

Furthermore, the following can arise:

$$sigZZ1=(piv \cdot (RL1/RL3-1)-piL \cdot (Rv1/Rv3-1))/(piv \cdot piLz-piL \cdot pivz) \qquad \text{Equation 27}$$

With the equations above, the following can arise:

$$Si1/Si3 \approx \qquad \text{Equation 28}$$

$$1 + \{P12 \cdot (piLz \cdot (Rv1/Rv3-1) - pivz \cdot (RL1/RL3-1)) +$$

$$P11 \cdot (piv \cdot (RL1/RL3-1) - piL \cdot$$

$$(Rv1/Rv3-1))\}/(piv \cdot piLz - piL \cdot pivz) \approx$$

$$1 + EPCv \cdot (Rv1/RV3-1) + EPCL \cdot (RL1/RL3-1)$$

where:

$$EPCv=(P12 \cdot piLz - P11 \cdot piL)/(piv \cdot piLz - piL \cdot pivz)$$

$$EPCL=(-P12 \cdot pivz + P11 \cdot piv)/(piv \cdot piLz - piL \cdot pivz)$$

The measuring circuit can calculate the stress dependence of the Hall sensor element 450 as:

$$Vout, compensated=Vout \ (1 \times EPCv \cdot (Rv1/RV3-1)-$$
$$EPCL \cdot (RL1/RL3-1)) \cdot (1-EPC \cdot STR3) \approx Vout \cdot \{1-$$
$$EPCv \cdot (Rv1/RV3-1)-EPCL \cdot (RL1/RL3-1)-$$
$$EPC \cdot STR3\} \qquad \text{Equation 29}$$

Example numerical values for the above example (in %/GPa):

P11=−85; P12=42 piL=−24; piLz=53 piv=39; pivz=−10

It can be assumed that in the vertical resistor there is a vertical current flow and also a small lateral current flow. A purely vertical current flow would yield pivz=−24.4%/GPa (for the dependence of the resistance of the vertical resistor on sigXX+sigYY) and piLz=+53.4/Gpa (for the dependence of the resistance of the vertical resistor on sigZZ).

The following can hold true here for the percentage x of the small lateral current flow:

39=(1−x)·53.4+x·(−24.4)

39−53.4=x·(−24.4−53.4)

x=0.185

Assuming that this percentage also holds true for pivz, it is possible to estimate pivz in accordance with equation 30:

$$pivz=(1-x) \cdot (-24.4)+x \cdot 53.4=-10\%/GPa \qquad \text{Equation 30}$$

Alternatively, piv and pivz can be measured experimentally in the laboratory on vertical resistors.

The following can furthermore arise:

$$EPCv = \qquad \text{Equations 31 and 32}$$

$$(P12 \cdot piLz - P11 \cdot piL)/(piv \cdot piLz - piL \cdot pivz) =$$

$$(42 \cdot 53 - (-85) \cdot (-24))/(39 \cdot 53 - (-24) \cdot (-10)) =$$

$$10.2\%/GPa$$

$$EPCL = (-P12 \cdot pivz + P11 \cdot piv)/(piv \cdot piLz - piL \cdot pivz) =$$

$$(-42 \cdot (-10) + (-85) \cdot 39)/(39 \cdot 53(-24) \cdot (-10)) = -158.5\%/GPa$$

In one concrete application, an sigXX1+sigYY1 of −150 MPa and an sigZZ1 of −25 MPa are assumed in the first region 430 (near the tip of the gap). In the second region 440 (in the center of the chip), by way of example, sigXX3+sigYY3 can be assumed to be −200 MPa and sigZZ3 can be assumed to be 0.

The following can then arise for the sensitivities:

$$Si1=1+0.42(-0.15)-0.85 \cdot (-0.025)=1-6.3\%+2.1\%=1-4.2\%$$

$$Si3=1+0.42 \cdot (-0.2)=1-8.4\%$$

$$Si1/Si3=1+4.2\% \qquad \text{Equations 33 to 35}$$

Furthermore, a measurement can yield:

$$Rv1/Rv3=1+0.39 \cdot (-0.15-(-0.2))-0.10 \cdot (-0.025-0)=1+2.2\%$$

$$RL1/RL3=1-0.24 \cdot (-0.15+0.2))+0.53 \cdot (-0.025-0)=1-2.5\%$$

$$EPCv \cdot (Rv1/Rv3-1)+EPCL \cdot$$
$$(RL1/RL3-1)=0.102 \cdot 2.2\%+$$
$$(-1.585) \cdot (-2.5\%)=0.2\%+4.0\%=4.2\% \qquad \text{Equations 36 to 38}$$

The result 4.2% from equation 38 would be correctly predicted by the stress gradient sensors (of the measuring circuit). In this example, the Rv stress sensor would have a small contribution in comparison with RL (RL is dominant).

In applications in which RL is dominant (for instance owing to the coefficient EPCL being 15 times greater), the RV sensor can be omitted. For example, RL can then be replaced with the input resistance Ri of the Hall plate 450. Moreover, an additional (small) Hall plate can be positioned in the second region 440 and Ri1/Ri3 can be determined instead of RL1/RL3. Alternatively, instead of the small Hall plate, it is possible to use two Hall resistors (in the L-layout). A Hall resistor can comprise an elongate strip composed of the same material and having the same thickness as those of the Hall plate.

The semiconductor circuit arrangement 400 can simplify a determination of the stress in the first region 430 or increase the accuracy thereof by measurement of a stress difference with respect to the second region 440.

Figure 5:
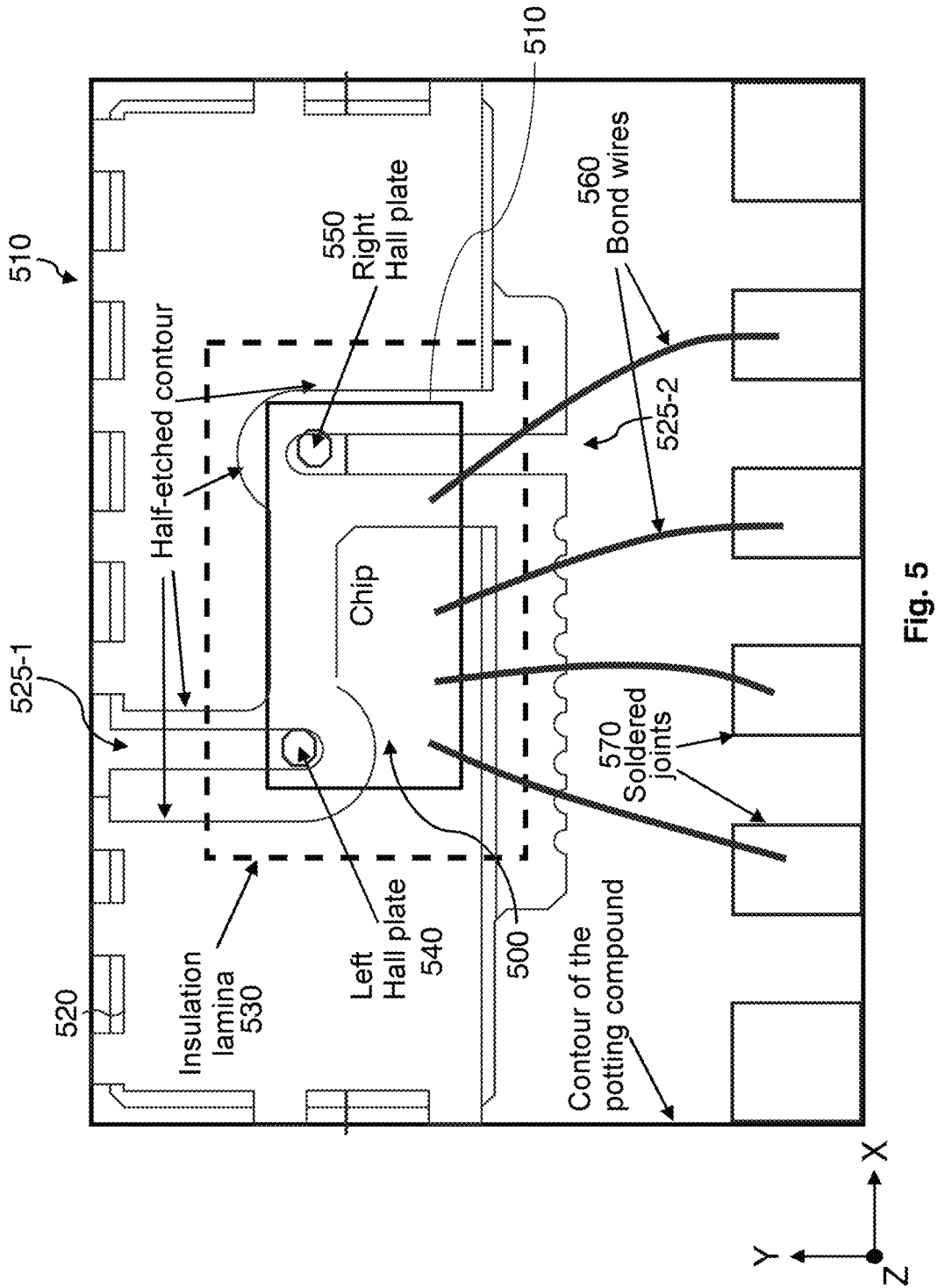
FIG. 5 shows a further example of a semiconductor circuit arrangement according to the implementation.

It should be noted that the principle of the technology described here can be applied to any circuit of arbitrary complexity: for example, FIG. 5 shows a further example implementation of a semiconductor circuit arrangement 500 (chip) arranged in a package 510. The chip 500 can be a coreless magnetic current sensor and can be a 75 micrometer thick silicon chip.

The chip 500 is mounted on a copper leadframe 520. The leadframe 520 is 200 micrometers thick and has two slots 525-1 and 525-2. The leadframe 520 is etched to half the thickness (half-etched contour) around the two slots 525-1, 525-2, at the underside of the main part of the leadframe 520 and between the tips of the slots. In the half-etched regions, the leadframe 520 is only 100 micrometers thick. It can be etched from the bottom—the top side of the leadframe 520 is flat.

A 75 micrometer thick electrical insulation lamina 530 (composed of glass, polyimide or ceramic) can be adhesively bonded onto the leadframe 520. The chip 500 can be adhesively bonded onto the lamina 530. The lamina 530 is 300 micrometers larger than the chip 500 at each edge in order to ensure good galvanic isolation.

The chip 500 comprises two Hall plates 540, 550 arranged above the tips of the slots 525-1 and 525-2, respectively. In FIG. 5, the current to be measured by the Hall plates 540, 550 flows from left to right through the busbar (main part of the leadframe 520). The busbar is connected to a printed circuit board (not shown) at the left and right sides in each case by way of two large soldered joints. The chip 500 comprises a measuring circuit (not shown), which can be situated on the top side of the silicon chip 500. The measuring circuit is connected to soldered joints 570 at the lower part of the package 510 by way of long bond wires 560. The package 510 is formed by a potting compound (mold body).

The slots 525-1, 525-3 force the current to be measured to flow in an S-shaped manner over the leadframe 520 around the two Hall plates 540, 550. In this case, the current generates a magnetic field at the Hall plates 540, 550, which in the case of the left Hall plate 540 points upward and in the case of the right Hall plate 550 points downward (into the plane of the drawing in FIG. 5).

The measuring circuit acquires the Hall output signals of the two Hall plates 540, 550 in order to determine the current. By way of example, the measuring circuit can subtract the Hall output signals in order to cancel the signal components of the approximately homogeneous magnetic background interference.

The insulation lamina 530 and the chip 500 should be assumed to be thin plates. Therefore, the slots 525-1, 525-2 in the leadframe 520 cause an inhomogeneous mechanical stress on the top side of the chip 500. That means that firstly the normal stress components acting in the x-y-plane (in-plane normal stresses) sigXX and sigYY in the vicinity of the slot tip differ from those in the center of the chip, and secondly that the out-of-plane normal stress component sigZZ in the vicinity of the slot tip differs from that in the center of the chip (where it is substantially equal to zero). The same also applies to the shear stresses sigXY, sigXZ, sigYZ, which influence many circuit elements not as much as the normal stresses sigXX, sigYY, sigZZ.

The chip 500 comprises a substrate and at least two first stress-sensitive elements in a first region of the substrate, in the vicinity of the slots 525-1, 525-2. The first stress-sensitive elements each have an electrical characteristic which is dependent on a first component (sigXX+sigYY) and a second component (sigZZ) of a mechanical stress tensor in the first region.

The chip 500 furthermore comprises at least two second stress-sensitive elements in a second region of the substrate, in the center of the chip. The second stress-sensitive elements each have an electrical characteristic which is dependent on a first component (sigXX+sigYY) and a second component (sigZZ) of a mechanical stress tensor in the second region.

The measuring circuit is configured, based on the respective electrical characteristics of the first stress-sensitive elements and of the second stress-sensitive elements, to determine a first stress difference between the first component in the first region and the first component in the second region and to determine a second stress difference between the second component in the first region and the second component in the second region.

A method according to the implementation for measuring an inhomogeneous mechanical stress in the first region can consist in positioning two different types of mechanically stress-sensitive circuit elements (stress-sensitive elements) A1, B1 in the first region (R1) and two identical circuit elements A2, B2 in the second region (R2), in which the mechanical stress sigXX2+sigYY2 is homogeneous and sigZZ2 is zero (or negligible). R2 is sufficiently far away from R1 (the distance can be at least as large as the region R1). R2 is additionally far enough away from the chip edge (the distance to the chip can correspond at least to a thickness of the chip).

The measuring circuit (stress gradient sensor) measures the difference in a stress-sensitive parameter (characteristic) of A1 in relation to that of A2, and likewise a difference of B1 in relation to B2. These differences in the parameters of the stress-sensitive elements are caused by differences in the mechanical stress (stress differences) (sigXX1+sigYY1− sigXX2−sigYY2) and (sigZZ1−0). The measuring circuit can thus estimate the stress differences based on the parameter differences.

The measuring circuit then measures the mechanical stress (sigXX2+sigYY2). For this purpose, it can for instance compare the respective parameters (characteristic) of two different circuit elements C2, D2 (e.g., the resistance of a vertical resistor with the resistance of a lateral resistor).

The measuring circuit can thus determine sigXX1+sigYY1 by determining (sigXX1+sigYY1−sigXX2−sigYY2) and (sigXX2+sigYY2) and then adding both terms. Furthermore, the measuring circuit can determine sigZZ1 by measuring sigZZ1−sigZZ2, where sigZZ2≈0 holds true. The measuring circuit can thus determine the two relevant stress components sigXX+sigYY and sigZZ in the first region.

The measuring circuit can use the information about the mechanical stress in order to counteract the latter's effect on a circuit element CE (for instance a sensor) in the first region. If CE is a Hall plate, for example, then the magnetic sensitivity thereof can increase by 4.2% if sigXX1+sigYY1 increases by 100 MPa, and can decrease by 8.5% if sigZZ1 increases by 100 MPa. In other words, if the combined mechanical stress increases the magnetic sensitivity of the Hall plate by 3%, the measuring circuit could decrease the supply current of the Hall plate by 3% if the output signal results from "sensitivity times supply current". Alternatively, the measuring circuit can control the gain of an amplifier circuit, which then amplifies the output voltage of the Hall plate by 3%. If the measuring circuit converts the analog output signal of the Hall plate into a digitized signal, the measuring circuit can implement the compensation digitally (by multiplication by 0.97).

In addition to sigXX+sigYY and sigZZ, the principle of the technology described here can be refined further so as to compensate for the components sigXX, sigYY, sigZZ, sigXY, sigXZ, sigYZ or a subgroup thereof. It shall be assumed that the subgroup has n stress components (e.g., n=2, or 3, . . . ). With n=3, the semiconductor circuit arrangement according to the implementation would comprise at least three circuits (generally n) of stress-sensitive elements A1, B1, C1 in the first region R1 and A2, B2, C2 in the second region R2. The measuring circuit would measure the differences in the characteristics A1/A2, B1/B2, C1/C2. Given knowledge of the piezocoefficients of the types A, B, C, the measuring circuit can deduce the differences in the three stress components in the first region and in the second region.

Preferably, the measuring circuit would carry out an absolute measurement of the three stress components in the second region with homogeneous mechanical stress. In the second region, it can be assumed in some cases that only sigXX and sigYY take effect, that is to say that the other stress components can be assumed to be zero. From that the measuring circuit can determine the three stress components in the first region and compensate for their combined effect on the original circuit element CE in the first region.

It can be assumed in some cases that the temperature in the first region and in the second region is virtually identical. This is not the case, however, in other cases, for instance if the chip (semiconductor circuit arrangement according to the implementation) becomes hotter in the vicinity of a gap tip of the leadframe owing to an increased current density (at high current intensity, e.g., 100 A). In cases mentioned last, the chip can use an additional temperature gradient sensor. By way of example, the chip can provide a bipolar diode (having a pn junction) as a temperature-sensitive element in each case in the first region and in the second region. While the same current flows through both temperature-sensitive elements, the voltage difference across the diodes can be measured (current $I_{diode}=I_{sat}\cdot exp(V_{be}/V_{th})$ where $V_{th}=k\cdot T/q$ and k: Boltzmann constant, T: absolute temperature, q: elementary charge).

From that the measuring circuit can determine the temperature difference between the first and second regions T1–T2. From the temperature difference and the nominal temperature coefficient of the stress-sensitive parameters A, B, C, the measuring circuit can compensate for the change in the characteristics (A1/A2) caused by T1>T2. The temperature drift can be subtracted from the measured difference A1/A2 in order to obtain a more accurate estimation of the mechanical stress difference.

For example, A can be a vertical resistor where Rv=Rv0· (1+TCv19 T+piv·sig), where TCv is the temperature coefficient of Rv and sig is the stress component that acts on Rv. This yields the following:

$$Rv1/Rv2=1+TCv\cdot(T1-T2)+piv\cdot(sig1-sig2)$$

$$(sig1-sig2)=(Rv1/Rv2-1-TCv\cdot(T1-T2))/piv$$

where Rv1/Rv2 can be measured and T1–T2 is known from the previous measurement.; piv is a constant predefined by the design (or a known temperature-dependent function). The measuring circuit can thus ascertain (sig1–sig2). If piv is likewise dependent on T, this can be taken into account in a similar manner to TCv.

The semiconductor circuit arrangement 500 can simplify a determination of the stress in the first region or increase the accuracy thereof by measurement of a stress difference with respect to the second region.

Figure 6:
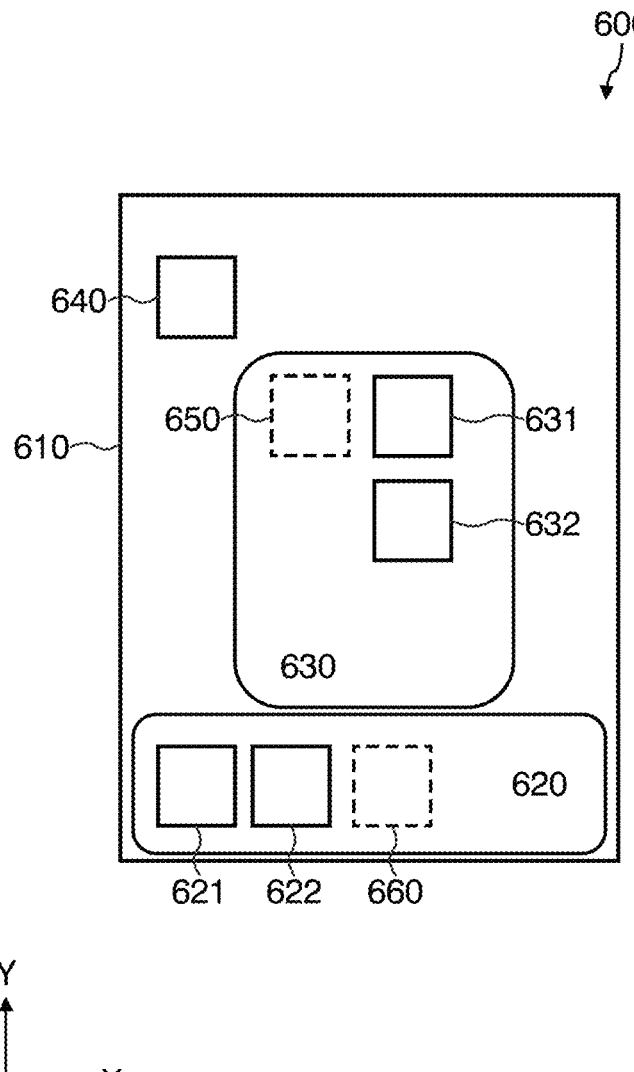
FIG. 6 shows a further example of a semiconductor circuit arrangement according to the implementation.

FIG. 6 shows a schematic illustration of a further example of a semiconductor circuit arrangement 600. The semiconductor circuit arrangement comprises a substrate 610. The semiconductor circuit arrangement 600 furthermore comprises a first stress-sensitive element 621 and a second stress-sensitive element 622 in a first region 620 of the substrate 610, a third stress-sensitive element 631 and a fourth stress-sensitive element 632 in a second region 630 of the substrate 610. The first stress-sensitive element 631 and the third stress-sensitive element 632 each have an electrical characteristic which is dependent at least on a first component of a mechanical stress tensor in the first region 620 and in the second region 630, respectively. The second stress-sensitive element 622 and the fourth stress-sensitive element 632 each have an electrical characteristic which is dependent at least on a second component of a mechanical stress tensor in the first region 620 and in the second region 630, respectively.

The semiconductor circuit arrangement 600 can have a layout similar to that of a semiconductor circuit arrangement explained above, for example semiconductor circuit arrangement 100, 400 or 500. The semiconductor circuit arrangement 600 can differ from the semiconductor circuit arrangements explained above for example in that the first stress-sensitive element 621 (of the first stress-sensitive elements) and the third stress-sensitive element 631 (of the second stress-sensitive elements) each have a sensitivity to the first component of the stress tensor, but—at least in some example implementations—no sensitivity to the second component. The semiconductor circuit arrangement 600 can additionally differ from the semiconductor circuit arrangements explained above in that the second stress-sensitive element 622 (of the first stress-sensitive elements) and the fourth stress-sensitive element 632 (of the second stress-sensitive elements) each have a sensitivity to the second component of the stress tensor, but—at least in some example implementations—no sensitivity to the first component. In the example implementations, the stress-sensitive elements 621, 622, 631, 632 should thus be chosen and arranged such that they are sensitive to one of the two components.

The semiconductor circuit arrangement 600 furthermore comprises a measuring circuit 640 configured, based on the respective electrical characteristics of the first stress-sensitive element 621 and of the third stress-sensitive element 631, to determine a first stress difference between the first component in the first region 620 and the first component in the second region 630 and, based on the respective electrical characteristics of the second stress-sensitive element 622 and of the fourth stress-sensitive element 632, to determine a second stress difference between the second component in the first region 620 and the second component in the second region 630.

The first component can be a component of the stress tensor that is different than the second component. The first component can correspond to an in-plane normal stress or to a sum of in-plane normal stresses. The second component can correspond to a shear stress or to an out-of-plane normal stress.

In some example implementations, the measuring circuit 640 can furthermore be configured to determine a value of the first component and/or a value of the second component in the first region 620 based on the first stress difference and/or the second stress difference, respectively. A value of the second component can be negligible in the second region 630.

In some example implementations, the semiconductor circuit arrangement 600 comprises at least one fifth stress-sensitive element 650 in the second region 630, wherein the fifth stress-sensitive element 650 has an electrical characteristic which is dependent on the first component of the mechanical stress tensor in the second region 630. The measuring circuit 640 can furthermore be configured to determine a value of the first component in the second region 630 based on the electrical characteristic of the fifth stress-sensitive element 650 and to determine the value of the first component in the first region 620 furthermore based on the value of the first component in the second region 630.

In some example implementations, the semiconductor circuit arrangement 600 comprises a sensor element 660 in the first region 620. The measuring circuit 640 is furthermore configured to determine a change in sensitivity of the sensor element 660 caused by the first component in the first region 620 and the second component in the first region 620, based on the first stress difference and the second stress difference.

In some example implementations, the measuring circuit 640 is configured to correct the change in sensitivity based on at least one out of controlling a supply current of the sensor element 660, controlling an amplifier coupled to the sensor element 660, and adapting a digitized signal output by the sensor element 660. In some example implementations, the sensor element 660 is a Hall sensor element.

In some example implementations, the first stress-sensitive element 621, the second stress-sensitive element 622, the third stress-sensitive element 631 and the fourth stress-sensitive element 632 each comprise at least one out of an electrical resistor, a field effect transistor, a Hall sensor element and a bipolar transistor. In some example implementations, the first stress-sensitive element 621, the second stress-sensitive element 622, the third stress-sensitive element 631 and the fourth stress-sensitive element 632 each comprise at least one out of a lateral resistor, a lateral transistor, a vertical resistor and a vertical transistor.

In some example implementations, the electrical characteristic of the first stress-sensitive element 621 has a dependence on the first component which substantially corresponds to a dependence on the first component of the electrical characteristic of the third stress-sensitive element 631. The electrical characteristic of the second stress-sensitive element 622 has a dependence on the second component which substantially corresponds to a dependence on the second component of the electrical characteristic of the fourth stress-sensitive element 632.

In some example implementations, the semiconductor circuit arrangement 600 comprises a first temperature-sensitive element in the first region, wherein the first temperature-sensitive element has an electrical characteristic which is dependent on a temperature in the first region 620. The semiconductor circuit arrangement 600 furthermore comprises a second temperature-sensitive element in the second region 630, wherein the second temperature-sensitive element has an electrical characteristic which is dependent on a temperature in the second region 630. The measuring circuit 640 is furthermore configured, based on the respective electrical characteristic of the first temperature-sensitive element and of the second temperature-sensitive element, to determine a temperature difference between the first region 620 and the second region 630 and to determine the first stress difference and the second stress difference based on the temperature difference.

In some example implementations the first region 620 is spaced apart from the second region 630 at least by a distance corresponding to half a thickness or to a thickness of the substrate 610.

Further details and aspects of the semiconductor circuit arrangement 600 are elucidated in association with the proposed technology or one or more examples described above, e.g., with reference to FIG. 1, FIG. 4 or FIG. 5. The semiconductor circuit arrangement 600 can comprise one or more additional optional features which correspond to one or more aspects of the proposed technology or to one or more of the examples described above.

FIG. 7 shows a flow diagram of one example of a method 700 for a semiconductor circuit arrangement, for example semiconductor circuit arrangement 100, 400 or 500. The semiconductor circuit arrangement comprises a substrate, at least two first stress-sensitive elements in a first region of the substrate, wherein the first stress-sensitive elements each have an electrical characteristic which is dependent on a first component and a second component of a mechanical stress tensor in the first region, and at least two second stress-sensitive elements in a second region of the substrate, wherein the second stress-sensitive elements each have an electrical characteristic which is dependent on a first component and a second component of a mechanical stress tensor in the second region.

The method 700 comprises determining 710, based on the respective electrical characteristics of the first stress-sensitive elements and of the second stress-sensitive elements, a first stress difference between the first component in the first region and the first component in the second region. The method 700 furthermore comprises determining 720, based on the respective electrical characteristics of the first stress-sensitive elements and of the second stress-sensitive elements, a second stress difference between the second component in the first region and the second component in the second region.

The method 700 can simplify a determination of the stress in the first region or increase the accuracy thereof by measurement of a stress difference with respect to the second region.

Further details and aspects of the method 700 are elucidated in association with the proposed technology or one or more examples described above, e.g., with reference to FIG. 1, FIG. 4 or FIG. 5. The method 700 can comprise one or more additional optional features which correspond to one or more aspects of the proposed technology or to one or more of the examples described above.

Aspects

The following aspects relate to further implementations:

Aspect 1 is a semiconductor circuit arrangement. The semiconductor circuit arrangement comprises a substrate and at least two first stress-sensitive elements in a first region of the substrate. The first stress-sensitive elements each have an electrical characteristic which is dependent on a first component and a second component of a mechanical stress tensor in the first region. The semiconductor circuit arrangement furthermore comprises at least two second stress-sensitive elements in a second region of the substrate. The second stress-sensitive elements each have an electrical characteristic which is dependent on a first component and a second component of a mechanical stress tensor in the second region. The semiconductor circuit arrangement furthermore comprises a measuring circuit configured, based on the respective electrical characteristics of the first stress-sensitive elements and of the second stress-sensitive elements, to determine a first stress difference between the first component in the first region and the first component in the second region and to determine a second stress difference between the second component in the first region and the second component in the second region.

Aspect 2 is the semiconductor circuit arrangement of aspect 1, wherein the first component corresponds to an in-plane normal stress or to a sum of in-plane normal stresses.

Aspect 3 is the semiconductor circuit arrangement of either of aspects 1 and 2, wherein the second component corresponds to a shear stress or to an out-of-plane normal stress.

Aspect 4 is the semiconductor circuit arrangement of any of aspects 1 to 3, wherein the measuring circuit is furthermore configured to determine a value of the first component and/or a value of the second component in the first region based on the first stress difference and/or the second stress difference, respectively.

Aspect 5 is the semiconductor circuit arrangement of any of aspects 1 to 4, wherein the measuring circuit is configured to determine the first stress difference and the second stress difference based on a ratio between the respective electrical characteristics of the first stress-sensitive elements and of the second stress-sensitive elements.

Aspect 6 is the semiconductor circuit arrangement of any of aspects 1 to 5, wherein a value of the second component in the second region is negligible.

Aspect 7 is the semiconductor circuit arrangement of any of aspects 4 to 6, furthermore comprising at least one third stress-sensitive element in the second region. The third stress-sensitive element has an electrical characteristic which is dependent on the first component of the mechanical stress tensor in the second region. The measuring circuit is furthermore configured to determine a value of the first component in the second region based on the electrical characteristic of the third stress-sensitive element and to determine the value of the first component in the first region furthermore based on the value of the first component in the second region.

Aspect 8 is the semiconductor circuit arrangement of any of aspects 1 to 7, furthermore comprising a sensor element in the first region. The measuring circuit is furthermore configured to determine a change in sensitivity of the sensor element caused by the first component in the first region and the second component in the first region, based on the first stress difference and the second stress difference.

Aspect 9 is the semiconductor circuit arrangement of aspect 8, wherein the measuring circuit is configured to correct the change in sensitivity based on at least one out of controlling a supply current of the sensor element, controlling an amplifier coupled to the sensor element, and adapting a digitized signal output by the sensor element.

Aspect 10 is the semiconductor circuit arrangement of either of aspects 8 and 9, wherein the sensor element is a Hall sensor element.

Aspect 11 is the semiconductor circuit arrangement of any of aspects 1 to 10, wherein the first stress-sensitive elements and the second stress-sensitive elements each comprise at least one out of an electrical resistor, a field effect transistor, a Hall sensor element and a bipolar transistor.

Aspect 12 is the semiconductor circuit arrangement of any of aspects 1 to 11, wherein the first stress-sensitive elements and the second stress-sensitive elements each comprise at least one out of a lateral resistor, a lateral transistor, a vertical resistor and a vertical transistor.

Aspect 13 is the semiconductor circuit arrangement of any of aspects 1 to 12, wherein the respective electrical characteristic of each of the first stress-sensitive elements has a dependence on the first component and the second component which substantially corresponds to a dependence on the first component and the second component of the electrical characteristic of a respective second stress-sensitive element.

Aspect 14 is the semiconductor circuit arrangement of any of aspects 1 to 13, wherein the electrical characteristic of one of the first stress-sensitive elements has a dependence on the first component and the second component which differs from a dependence on the first component and the second component of the electrical characteristic of the respectively other of the first stress-sensitive elements. The electrical characteristic of one of the second stress-sensitive elements has a dependence on the first component and the second component which differs from a dependence on the first component and the second component of the electrical characteristic of the respectively other of the second stress-sensitive elements.

Aspect 15 is the semiconductor circuit arrangement of any of aspects 1 to 14, furthermore comprising a first temperature-sensitive element in the first region. The first temperature-sensitive element has an electrical characteristic which is dependent on a temperature in the first region. The semiconductor circuit arrangement furthermore comprises a second temperature-sensitive element in the second region. The second temperature-sensitive element has an electrical characteristic which is dependent on a temperature in the second region. The measuring circuit is furthermore configured, based on the respective electrical characteristic of the first temperature-sensitive element and of the second temperature-sensitive element, to determine a temperature difference between the first region and the second region and to determine the first stress difference and the second stress difference based on the temperature difference.

Aspect 16 is the semiconductor circuit arrangement of any of aspects 1 to 15, wherein the first region is spaced apart from the second region at least by a distance corresponding to half a thickness or to a thickness of the substrate.

Aspect 17 is the semiconductor circuit arrangement of any of aspects 1 to 16, wherein the respective electrical characteristic of each of the first stress-sensitive elements has a dependence on a temperature in the first region which substantially corresponds to a dependence on a temperature in the second region of the electrical characteristic of a respective second stress-sensitive element.

Aspect 18 is a semiconductor circuit arrangement, comprising: a substrate, a first stress-sensitive element and a second stress-sensitive element in a first region of the substrate, a third stress-sensitive element and a fourth stress-sensitive element in a second region of the substrate. The first stress-sensitive element and the third stress-sensitive element each have an electrical characteristic which is dependent at least on a first component of a mechanical stress tensor in the first region and in the second region, respectively. The second stress-sensitive element and the fourth stress-sensitive element each have an electrical characteristic which is dependent at least on a second component of the mechanical stress tensor in the first region and in the second region, respectively. The semiconductor circuit arrangement furthermore comprises a measuring circuit configured, based on the respective electrical characteristics of the first stress-sensitive element and of the third stress-sensitive element, to determine a first stress difference between the first component in the first region and the first component in the second region. The measuring circuit is furthermore configured, based on the respective electrical characteristics of the second stress-sensitive element and of the fourth stress-sensitive element, to determine a second stress difference between the second component in the first region and the second component in the second region.

Aspect 19 is the semiconductor circuit arrangement of aspect 18, wherein the first component is a component of the stress tensor which is different than the second component.

Aspect 20 is the semiconductor circuit arrangement of either of aspects 18 and 19, wherein the first component corresponds to an in-plane normal stress or to a sum of in-plane normal stresses.

Aspect 21 is the semiconductor circuit arrangement of any of aspects 18 to 20, wherein the second component corresponds to a shear stress or to an out-of-plane normal stress.

Aspect 22 is the semiconductor circuit arrangement of any of aspects 18 to 21, wherein the measuring circuit is furthermore configured to determine a value of the first component and/or a value of the second component in the first region based on the first stress difference and/or the second stress difference, respectively.

Aspect 23 is the semiconductor circuit arrangement of any of aspects 18 to 22, wherein a value of the second component in the second region is negligible.

Aspect 24 is the semiconductor circuit arrangement of either of aspects 22 and 23, furthermore comprising at least one fifth stress-sensitive element in the second region. The fifth stress-sensitive element has an electrical characteristic which is dependent on the first component of the mechanical stress tensor in the second region. The measuring circuit is furthermore configured to determine a value of the first component in the second region based on the electrical characteristic of the fifth stress-sensitive element and to determine the value of the first component in the first region furthermore based on the value of the first component in the second region.

Aspect 25 is the semiconductor circuit arrangement of any of aspects 18 to 24, furthermore comprising a sensor element in the first region. The measuring circuit is furthermore configured to determine a change in sensitivity of the sensor element caused by the first component in the first region and the second component in the first region, based on the first stress difference and the second stress difference.

Aspect 26 is the semiconductor circuit arrangement of aspect 25, wherein the measuring circuit is configured to correct the change in sensitivity based on at least one out of controlling a supply current of the sensor element, controlling an amplifier coupled to the sensor element, and adapting a digitized signal output by the sensor element.

Aspect 27 is the semiconductor circuit arrangement of either of aspects 25 and 26, wherein the sensor element is a Hall sensor element.

Aspect 28 is the semiconductor circuit arrangement of any of aspects 18 to 27, wherein the first stress-sensitive element, the second stress-sensitive element, the third stress-sensitive element and the fourth stress-sensitive element each comprise at least one out of an electrical resistor, a field effect transistor, a Hall sensor element and a bipolar transistor.

Aspect 29 is the semiconductor circuit arrangement of any of aspects 18 to 28, wherein the first stress-sensitive element, the second stress-sensitive element, the third stress-sensitive element and the fourth stress-sensitive element each comprise at least one out of a lateral resistor, a lateral transistor, a vertical resistor and a vertical transistor.

Aspect 30 is the semiconductor circuit arrangement of any of aspects 18 to 29, wherein the electrical characteristic of the first stress-sensitive element has a dependence on the first component which substantially corresponds to a dependence on the first component of the electrical characteristic of the third stress-sensitive element, and wherein the electrical characteristic of the second stress-sensitive element has a dependence on the second component which substantially corresponds to a dependence on the second component of the electrical characteristic of the fourth stress-sensitive element.

Aspect 31 is the semiconductor circuit arrangement of any of aspects 18 to 30, furthermore comprising a first temperature-sensitive element in the first region, wherein the first temperature-sensitive element has an electrical characteristic which is dependent on a temperature in the first region. The semiconductor circuit arrangement furthermore comprises a second temperature-sensitive element in the second region, wherein the second temperature-sensitive element has an electrical characteristic which is dependent on a temperature in the second region. The measuring circuit is furthermore configured, based on the respective electrical characteristic of the first temperature-sensitive element and of the second temperature-sensitive element, to determine a temperature difference between the first region and the second region and to determine the first stress difference and the second stress difference based on the temperature difference.

Aspect 32 is the semiconductor circuit arrangement of any of aspects 18 to 31, wherein the first region is spaced apart from the second region at least by a distance corresponding to half a thickness or to a thickness of the substrate.

Aspect 33 is a method for a semiconductor circuit arrangement, comprising a substrate, at least two first stress-sensitive elements in a first region of the substrate, wherein the first stress-sensitive elements each have an electrical characteristic which is dependent on a first component and a second component of a mechanical stress tensor in the first region, and at least two second stress-sensitive elements in a second region of the substrate, wherein the second stress-sensitive elements each have an electrical characteristic which is dependent on a first component and a second component of a mechanical stress tensor in the second region. The method comprises determining, based on the respective electrical characteristics of the first stress-sensitive elements and of the second stress-sensitive elements, a first stress difference between the first component in the first region and the first component in the second region, and determining, based on the respective electrical characteristics of the first stress-sensitive elements and of the second stress-sensitive elements, a second stress difference between the second component in the first region and the second component in the second region.

The aspects and features that have been described in association with a specific one of the aspects above can also be combined with one or more of the further aspects in order to replace an identical or similar feature of this further aspect or in order additionally to introduce the feature into the further aspect.

Aspects can furthermore be or relate to a (computer) program comprising a program code for carrying out one or more of the above methods when the program is executed on a computer, a processor or some other programmable hardware component. Steps, operations or processes of various methods from among those described above can thus also be performed by programmed computers, processors or other programmable hardware components. Aspects can also cover program storage devices, e.g., digital data storage media, which are machine-, processor- or computer-readable and code or contain machine-executable, processor-executable or computer-executable programs and instructions. The program storage devices can comprise or be e.g., digital memories, magnetic storage media such as, for aspect, magnetic disks and magnetic tapes, hard disk drives or optically readable digital data storage media.

It furthermore goes without saying that the disclosure of a plurality of steps, processes, operations or functions disclosed in the description or the claims should not be interpreted as being mandatorily in the order described, unless this is explicitly indicated or absolutely necessary for technical reasons in an individual case. Therefore, the preceding description does not limit the implementation of a plurality of steps or functions to a specific order. Furthermore, in further aspects, an individual step, an individual function, an individual process or an individual operation can include a plurality of partial steps, partial functions, partial processes or partial operations and/or be subdivided into them.

Where some aspects in the preceding sections have been described in association with a device or a system, these aspects should also be understood as a description of the corresponding method. In this case, for aspect, a block, a device or a functional aspect of the device or of the system can correspond to a feature, for instance a method step, of the corresponding method. Analogously thereto, aspects described in association with a method should also be understood as a description of a corresponding block, a corresponding element, a property or a functional feature of a corresponding device or a corresponding system.

The claims that follow are hereby incorporated in the detailed description, where each claim can be representative of a separate aspect by itself. Furthermore, it should be taken into consideration that—although a dependent claim refers in the claims to a specific combination with one or more other claims—other aspects can also encompass a combination of the dependent claim with the subject matter of any other dependent or independent claim. Such combinations are hereby explicitly proposed, provided that in an individual case no indication is given that a specific combination is not intended. Furthermore, features of a claim are also intended to be included for any other independent claim, even if this claim is not directly defined as being dependent on this other independent claim.

The invention claimed is:

1. A semiconductor circuit arrangement, comprising:

a substrate;

at least two first stress-sensitive elements in a first region of the substrate, wherein the at least two first stress-sensitive elements each have an electrical characteristic which is dependent on a first component of a mechanical stress tensor in the first region and a second component of the mechanical stress tensor;

at least two second stress-sensitive elements in a second region of the substrate, wherein the at least two second stress-sensitive elements each have an electrical characteristic which is dependent on a first component of a mechanical stress tensor in the second region and a second component of the mechanical stress tensor, wherein the second region is a reference region wherein the mechanical stress tensor in the second region is constant or negligible; and a measuring circuit configured, based on the electrical characteristic of each of the at least two first stress-sensitive elements and the electrical characteristic of each of the at least two second stress-sensitive elements:

to determine a first stress difference between the first component of the mechanical stress tensor in the first region and the first component of the mechanical stress tensor in the second region; and to determine a second stress difference between the second component of the mechanical stress tensor in the first region and the second component of the mechanical stress tensor in the second region.

2. The semiconductor circuit arrangement as claimed in claim 1, wherein the first component of the mechanical stress tensor in the first region corresponds to an in-plane normal stress or to a sum of in-plane normal stresses.

3. The semiconductor circuit arrangement as claimed in claim 1, wherein the second component of the mechanical stress tensor in the first region corresponds to a shear stress or to an out-of-plane normal stress.

4. The semiconductor circuit arrangement as claimed in claim 1, wherein the measuring circuit is furthermore configured to determine one or more of a value of the first component of the mechanical stress tensor in the first region based on the first stress difference, or a value of the second component of the mechanical stress tensor in the first region based on the second stress difference.

5. The semiconductor circuit arrangement as claimed in claim 4, furthermore comprising:

at least one third stress-sensitive element in the second region, wherein the at least one third stress-sensitive element has an electrical characteristic which is dependent on the first component of the mechanical stress tensor in the second region, and wherein the measuring circuit is furthermore configured:

to determine a value of the first component of the mechanical stress tensor in the second region based on the electrical characteristic of the third stress-sensitive element; and to determine the value of the first component of the mechanical stress tensor in the first region furthermore based on the value of the first component of the mechanical stress tensor in the second region.

6. The semiconductor circuit arrangement as claimed in claim 1, furthermore comprising:

a sensor element in the first region, and wherein the measuring circuit is furthermore configured to determine a change in sensitivity of the sensor element caused by the first component of the mechanical stress tensor in the first region (120) and the second component of the mechanical stress tensor in the first region, based on the first stress difference and the second stress difference.

7. The semiconductor circuit arrangement as claimed in claim 6, wherein the measuring circuit is configured to:

correct the change in sensitivity based on at least one of:

controlling a supply current of the sensor element, controlling an amplifier coupled to the sensor element, or adapting a digitized signal output by the sensor element.

8. The semiconductor circuit arrangement as claimed in claim 6, wherein the sensor element is a Hall sensor element.

9. The semiconductor circuit arrangement as claimed in claim 1, wherein the at least two first stress-sensitive elements and the at least two second stress-sensitive elements each comprise at least one of:

an electrical resistor, a field effect transistor, a Hall sensor element, or a bipolar transistor.

10. The semiconductor circuit arrangement as claimed in claim 1, wherein the at least two first stress-sensitive elements and the at least two second stress-sensitive elements each comprise at least one of:

a lateral resistor, a lateral transistor, a vertical resistor, or a vertical transistor.

11. The semiconductor circuit arrangement as claimed in claim 1, wherein the electrical characteristic of each of the at least two first stress-sensitive elements has a dependence on the first component of the mechanical stress tensor in the first region and the second component of the mechanical stress tensor in the first region which substantially corresponds to a dependence on the first component of the mechanical stress tensor in the second region and the second component of the mechanical stress tensor in the second region of the electrical characteristic of a respective second stress-sensitive element of the at least two second stress-sensitive elements.

12. The semiconductor circuit arrangement as claimed in claim 1, wherein the electrical characteristic of one of the at least two first stress-sensitive elements has a dependence on the first component of the mechanical stress tensor in the first region and the second component of the mechanical stress tensor in the first region which differs from a dependence on the first component of the mechanical stress tensor in the second region and the second component of the mechanical stress tensor in the second region of the electrical characteristic of another one of the at least two first stress-sensitive elements, and wherein the electrical characteristic of one of the at least two second stress-sensitive elements has a dependence on the first component of the mechanical stress tensor in the second region and the second component of the mechanical stress tensor in the second region which differs from a dependence on the first component of the mechanical stress tensor in the second region and the second component of the mechanical stress tensor in the second region of the electrical characteristic of another one of the at least two second stress-sensitive elements.

13. The semiconductor circuit arrangement as claimed in claim 1, furthermore comprising:

a first temperature-sensitive element in the first region, wherein the first temperature-sensitive element has an electrical characteristic which is dependent on a temperature in the first region; and a second temperature-sensitive element in the second region, wherein the second temperature-sensitive element has an electrical characteristic which is dependent on a temperature in the second region, and wherein the measuring circuit is furthermore configured, based on the electrical characteristic of the first temperature-sensitive element and the electrical characteristic of the second temperature-sensitive element, to:

determine a temperature difference between the first region and the second region, and determine the first stress difference and the second stress difference based on the temperature difference.

14. The semiconductor circuit arrangement as claimed in claim 1, wherein the first region is spaced apart from the second region at least by a distance corresponding to:

half a thickness, or a thickness of the substrate.

15. A semiconductor circuit arrangement, comprising:

a substrate;

a first stress-sensitive element in a first region of the substrate, a second stress-sensitive element in the first region of the substrate;

a third stress-sensitive element in a second region of the substrate, wherein the second region is a reference region wherein a mechanical stress tensor in the second region is constant or negligible;

a fourth stress-sensitive element in the second region of the substrate, wherein the first stress-sensitive element has an electrical characteristic which is dependent at least on a first component of a mechanical stress tensor in the first region, wherein the third stress-sensitive element has an electrical characteristic which is dependent at least on a first component of a mechanical stress tensor in in the second region, wherein the second stress-sensitive element has an electrical characteristic which is dependent on at least a second component of the mechanical stress tensor in the first region, and wherein the fourth stress-sensitive element has an electrical characteristic which is dependent at least on a second component of the mechanical stress tensor in the second region; and a measuring circuit configured:

based on the electrical characteristic of the first stress-sensitive element and the electrical characteristic of the third stress-sensitive element, to determine a first stress difference between the first component of the mechanical stress tensor in the first region and the first component of the mechanical stress tensor in the second region); and based on the electrical characteristic of the second stress-sensitive element and the electrical characteristic of the fourth stress-sensitive element, to determine a second stress difference between the second component of the mechanical stress tensor in the first region and the second component of the mechanical stress tensor in the second region.

16. The semiconductor circuit arrangement as claimed in claim 15, wherein the first component of the mechanical stress tensor is a component of the mechanical stress tensor in the first region which is different than the second component of the mechanical stress tensor in the first region.

17. The semiconductor circuit arrangement as claimed in claim 15, wherein the first component of the mechanical stress tensor in the first region corresponds to an in-plane normal stress or to a sum of in-plane normal stresses.

18. A method for a semiconductor circuit arrangement comprising:

wherein the semiconductor circuit arrangement comprises a substrate comprising:

at least two first stress-sensitive elements in a first region of the substrate, wherein the at least two first stress-sensitive elements each have an electrical characteristic which is dependent on a first component of a mechanical stress tensor in the first region and a second component of the mechanical stress tensor in the first region; and at least two second stress-sensitive elements in a second region of the substrate, wherein the at least two second stress-sensitive elements each have an electrical characteristic which is dependent on a first component of a mechanical stress tensor in the second region and a second component of the mechanical stress tensor in the second region, and wherein the second region is a reference region wherein the mechanical stress tensor in the second region is constant or negligible; and wherein the method comprises:

determining, based on the electrical characteristic of each of the at least two first stress-sensitive elements and the electrical characteristic of each of the at least two second stress-sensitive elements, a first stress difference between the first component of the mechanical stress tensor in the first region and the first component of the mechanical stress tensor in the second region; and determining, based on the electrical characteristic of each of the at least two first stress-sensitive elements and the electrical characteristic of each of the at least two second stress-sensitive elements, a second stress difference between the second component of the mechanical stress tensor in the first region and the second component of the mechanical stress tensor in the second region.

19. The method of claim 18, wherein the first component of the mechanical stress tensor in the first region corresponds to an in-plane normal stress or to a sum of in-plane normal stresses.

20. The method of claim 18, wherein the second component of the mechanical stress tensor in the first region corresponds to a shear stress or to an out-of-plane normal stress.

* * * * *